US007107485B2

(12) United States Patent
Baba et al.

(10) Patent No.: US 7,107,485 B2
(45) Date of Patent: Sep. 12, 2006

(54) METHOD, APPARATUS, AND COMPUTER READABLE MEDIUM FOR MANAGING MULTIPLE SYSTEM

(75) Inventors: Tsunehiko Baba, Kokubunji (JP); Takayuki Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 10/766,802

(22) Filed: Jan. 30, 2004

(65) Prior Publication Data
US 2004/0230625 A1 Nov. 18, 2004

(30) Foreign Application Priority Data
Mar. 5, 2003 (JP) .............................. 2003-057937

(51) Int. Cl.
*G06F 12/16* (2006.01)
*G06F 11/34* (2006.01)
(52) U.S. Cl. .................. 714/13; 714/5; 714/6; 711/162
(58) Field of Classification Search ................ 711/161, 711/162; 713/229, 201
See application file for complete search history.

(56) References Cited
U.S. PATENT DOCUMENTS

| | | | | |
|---|---|---|---|---|
| 5,598,577 | A * | 1/1997 | Overfield | 710/10 |
| 5,884,328 | A * | 3/1999 | Mosher, Jr. | 707/202 |
| 6,240,511 | B1 * | 5/2001 | Blumenau et al. | 713/1 |
| 6,401,178 | B1 * | 6/2002 | Gagne et al. | 711/162 |
| 6,643,795 | B1 * | 11/2003 | Sicola et al. | 714/6 |
| 2002/0095489 | A1 * | 7/2002 | Yamagami | 709/224 |
| 2003/0093439 | A1 * | 5/2003 | Mogi et al. | 707/200 |
| 2003/0229764 | A1 * | 12/2003 | Ohno et al. | 711/147 |
| 2004/0030730 | A1 | 2/2004 | Arai et al. | |
| 2004/0139205 | A1 * | 7/2004 | Ichikawa et al. | 709/229 |
| 2004/0158766 | A1 * | 8/2004 | Liccione et al. | 714/4 |
| 2004/0243778 | A1 | 12/2004 | Barrios et al. | |
| 2004/0260873 | A1 | 12/2004 | Watanabe | |

OTHER PUBLICATIONS

"Migrated Data Backup Utility" IBM Technical Disclosure Bulletin, Jun. 1994, pp. 1-3.

* cited by examiner

*Primary Examiner*—B. James Peikari
(74) *Attorney, Agent, or Firm*—Mattingly, Stanger, Malur & Brundidge, P.C.

(57) ABSTRACT

Method and system for reflecting a change of a copy VOL caused by VOL replica means upon a standby party. In a living and standby party computer system for operating original volumes and copy volumes by using volume replica, after having executed a volume replica, the living party informs the standby party that a copy volume is changed and the standby party reflects changed copy volume information upon the self-party. Through this, even after a fault occurs in the living party and party switchover is done, the standby party can access the copy volume on the basis of the information reflected upon the standby party to continue a process.

6 Claims, 14 Drawing Sheets

FIG.15

| ORIGINAL VOL (1501) | PVID OF ORIGINAL VOL (1502) | VOL INFORMATION OF ORIGINAL VOL (1503) |
|---|---|---|
| COPY VOL | PVID OF COPY VOL | VOL INFORMATION OF COPY VOL |
| 1511 ... | 1512 ... | 1513 ... |

FIG.16

| PAIR IDENTIFIER (1600) | ORIGINAL VOL PHYSICAL NAME (1601) | COPY VOL PHYSICAL NAME (1602) | ACTIVE COMPUTER STATUS FLAG (1603) | STANDBY COMPUTER STATUS FLAG (1604) | DIVISION FLAG (1605) |
|---|---|---|---|---|---|
| 1 | hdisk0 | hdisk100 | A1 | B1 | PAIR DIVISION |
| 2 | hdisk3 | hdisk104 | B2 | A3 | PAIR RECONSTRUCTION |
|  |  |  |  |  |  |
| N | hdisk20 | hdisk75 | 0 | 0 |  |

METHOD, APPARATUS, AND COMPUTER READABLE MEDIUM FOR MANAGING MULTIPLE SYSTEM

BACKGROUND OF THE INVENTION

In present-day society, computer systems have been indispensable for providing the active basis supporting our life. Such a computer system as above is required to continue service for 24 hours without stopping. Available as one of these computer systems is an on-line system employed in banks and the like which handles database business affairs as a key or core process. The database business affairs are updated frequently and are therefore permitted of no complete or thorough stoppage. But, on the other hand, there is a demand for creating backups in expectation of protection of data to be handled.

In the database, data to be handled are stored in volumes (hereinafter abbreviated as VOL's) representing memory areas or storages areas precedently set in a disk device so constructed as to include a storage medium such as a magnetic disk and the data are processed. The VOL is a unit of the memory area and is sometimes called by the name of partition. The VOL is identified with a physical VOL identifier (PVID) and the computer system recognizes the VOL by acquiring VOL information through the use of the PVID. The PVID and VOL information are acquired by a disk management program and saved in a disk management information buffer on an operating system (OS). It will be appreciated that a variety of PVID's are available and in an OS called AIX (registered trademark of IBM Inc.), for instance, the PVID is handled in the form of hexadecimal data such as "005247772d2f36b". An application such as database and the OS accesses (reads and writes) a VOL recognized on the basis of information in the buffer. Let us consider an instance where, for example, an application program accesses a file. In this case, on the basis of a physical device name corresponding to the file to be accessed (hereinafter also termed a physical name and as an example of concreted data, "hdisk0" is used in, for example, the OS called AIX (registered trademark of IBM Inc.), identification information (physical address such as LUN) in a disk device of a physical memory medium identified (from the OS) by that physical device name is designated and a request for access to the disk device is transmitted. At that time, verification is carried out as to whether a PVID stored in a given area of the memory medium to be accessed coincides with a PVID stored in the aforementioned disk management information buffer. If the result of verification shows non-coincidence between the PVID's, this result is handled as an access error.

As will be seen from the above, a technique of realizing a replication of VOL without causing the database to stop thoroughly is important. The prevention of complete stoppage intends to attain recovery of a system within a short period of time in the range of not causing troubles in business affairs even in the event that the system becomes faulty so that system users may be prevented from recognizing that the system stands stopped. To this end, a technique disclosed in U.S. Pat. No. 6,401,178 (corresponding to JP-A-2002-41368) is known according to which replica of data in a disk is executed in a disk device and this technique is applied to VOL's to provide a technique called VOL replica. The VOL replica includes two means for pair construction and pair division directed to paired VOL's of original VOL representing a data replication source and copy VOL representing a data replication target. The pair construction is means for fast creating a copy VOL representing a replica of an original VOL by making coincident (synchronized) all data pieces including PVID's of original/copy VOL's and VOL information. Accordingly, in a status of pair construction, the PVID's of the original/copy VOL's are coincident with each other, thereby providing a function of enabling the host computer system to recognize the original/copy VOL's impersonating a sole VOL. On the other hand, the pair division is means for cancelling the synchronization of the original/copy VOL's and rewriting the PVID of the copy VOL of the paired VOL's taking the pair construction into a PVID different from that of the original VOL. This provides a function of dividing the paired VOL's recognized as a sole VOL by the host computer system during pair construction and enabling the system to recognize the original and copy VOL's as different VOL's. These two means provide a function of creating a replica of the original VOL at a high speed and permitting the computer system to operate a replicated copy VOL.

On the other hand, a computer system required to have high reliability of recovery within short period of time is so constructed as to include an active computer or a active computer for executing processes and a standby computer for taking over a process in the event that a fault occurs in the active computer. A cluster program for managing the active and standby computers provides a procedure for handing the process to the standby computer at the time that the fault occurring in the active computer is detected. For handing over the process, data used in the application and OS must be handed over. For example, in the aforementioned database system, it becomes necessary that information concerning a VOL in which data to be handled is stored be handed over.

SUMMARY OF THE INVENTION

In the aforementioned VOL replication techniques, however, replication is carried out inside the disk device and therefore any other computer than that having executed the replication has no information concerning replicated data. Accordingly, in the event that a fault occurs in a active computer having executed replication and the party switchover takes place in a computer system applied with the cluster program, a PVID of a volume which is subjected to the aforementioned replication and which is stored in the disk management information buffer of a standby computer having taken over the process is conditioned not to coincide with a PVID stored in a memory medium inside the disk device and corresponding to the volume of interest. When the standby computer computer accesses that volume under this condition, the result of verification of PVID's shows non-coincidence and an access error results. The aforementioned prior arts fail to consider these points.

More specifically, in case a fault takes place in the active computer/standby computer computer system sharing original/copy VOL's subjected to VOL replication (pair construction and pair division), the standby computer fails to access a copy VOL, then the standby computer cannot take over the active computer. This is because the PVID of the copy VOL is rewritten through the VOL replica and this change is reflected upon the active computer whereas the standby computer tries to access the copy VOL in accordance with information stored in the disk management information buffer before the execution of the VOL replica.

As will be seen from the above, when utilizing the two means of cluster program and VOL replica for attaining high reliability, the conventional techniques raise a problem that a situation occurs in which a process undertaken by both the active and standby computers cannot be taken over.

A first object of the present invention is to provide method and system which can reflect a change of a copy VOL caused by both the VOL replica means upon the standby computer.

A second object of the invention is to provide method and system in which, when a fault occurs in the active or standby computer in the course of the fact that a copy VOL is changed by VOL replica means and reflection of the change is executed, the change of the copy VOL and the reflection of the change can be taken over.

A third object of the invention is to provide method and system in which, when a fault occurs in the active computer after execution of the VOL replica means, a process having been executed by the active computer can be taken over to the standby computer.

A fourth object of the invention is to provide method and system in which, when a standby computer in association with a active computer using a computer system utilizing the VOL replica means is newly added, a change of a copy VOL can be reflected upon the standby computer.

A fifth object of the invention is to provide method and system in which, when a standby computer in association with a active computer using a computer system utilizing the VOL replica means is newly added and a fault occurs in the active computer or in the standby computer in the course of reflection of a change of a copy VOL upon the standby computer, the change of the copy VOL and the reflection of the change can be taken over.

A sixth object of the invention is to provide method and system in which, when a standby computer in association with a active computer using a computer system utilizing the VOL replica means is newly added and thereafter a fault occurs in the active computer, a process executed by the active computer can be taken over to the standby computer.

According to the present invention, in a high available computer system comprised of a active computer/standby computer computer system and in which the active/standby computers share paired VOL's subjected to execution of the VOL replica, a physical name of a copy VOL to be changed by the VOL replica is acquired during start of a cluster program. For example, by reading a physical name of a copy VOL saved in a file for setting the VOL replica, the physical name can be acquired.

Further, when executing the VOL replica by means of the active computer, the active computer informs the standby computer of the time of start of execution of the VOL replica and after completion of the VOL replica, thereby enabling the standby computer to recognize that the active computer has changed the copy VOL.

When being informed of the change of the copy VOL, the standby computer conducts a process for reflecting the change in copy VOL status. For example, when the pair division is carried out in the VOL replica, a physical name of a copy VOL which has already been acquired is used to acquire the PVID of the copy VOL set newly, and further, information of the copy VOL is acquired using that PVID. In this manner, copy VOL information after the change is reflected to permit the standby computer to access the copy VOL.

When completing the reflection of the copy VOL information, the standby computer informs the active computer that the reflection is completed. By receiving this notice, the active computer recognizes that consistency of the copy VOL information is guaranteed.

Each of such a plurality of computer parties has, as a status flag, a VOL replica status indicating whether the VOL replica has been executed in the active computer and whether the copy VOL information is reflected upon the standby computer. The status flag is also stored, as a status file, on the computer system. Further, when interchanging information between the active and standby computers, the status flag is informed to the partner side in order that process states of the active and standby computers can be recognized.

In addition, a VOL replica status at the time of starting the cluster program is also acquired to examine whether the copy VOL information is coincident between the active and standby computers. For example, by reading a copy VOL reflection status saved in the VOL replica status file, it is decided whether the copy VOL information is reflected upon both the active and standby computers. In case the copy VOL information is not reflected upon the standby computer, the active computer commands the standby computer to reflect the copy VOL information thereupon and the standby computer fulfils the reflection of the copy VOL information. In this manner, even when the VOL replica process or the copy VOL information reflection process is interrupted, the interrupted process can be taken over and resumed.

In describing the present invention, the term PVID is used but it is to be noted that the "volume" to be identified with this identifier may be managed in a unit of any type. For example, in connection with the "volume", a unit termed LU (logical unit), a unit obtained by somewhat dividing the LU or a unit constructed of several LU's may be handled as "volume".

BRIEF DESCRIPTION OF THE DRAWINGS

FIG. 15 is a table showing an example of information held by a volume management section.

FIG. 16 is a table showing an example of a replica status management table representing one type of management form of the VOL replica status flag.

DETAILED DESCRIPTION OF THE EMBODIMENTS

It should be understood that drawings and description illustrative of the present invention are simplified to show appropriate components for better and clear understanding of the invention and known components are omitted. In connection with the technique of the present invention, some other components of the conventional techniques seem to be desirable and/or necessary for carrying out the present invention. But these components in the conventional techniques are known and are not effective to make the present invention understandable easily and will not be described herein. The present invention will now be described in greater detail with reference to the accompanying drawings.

The present embodiment intends to provide a VOL information consistency guaranty system capable of reflecting information of a VOL representing an object of VOL replica executed by a active computer upon a standby computer.

Figure 1:
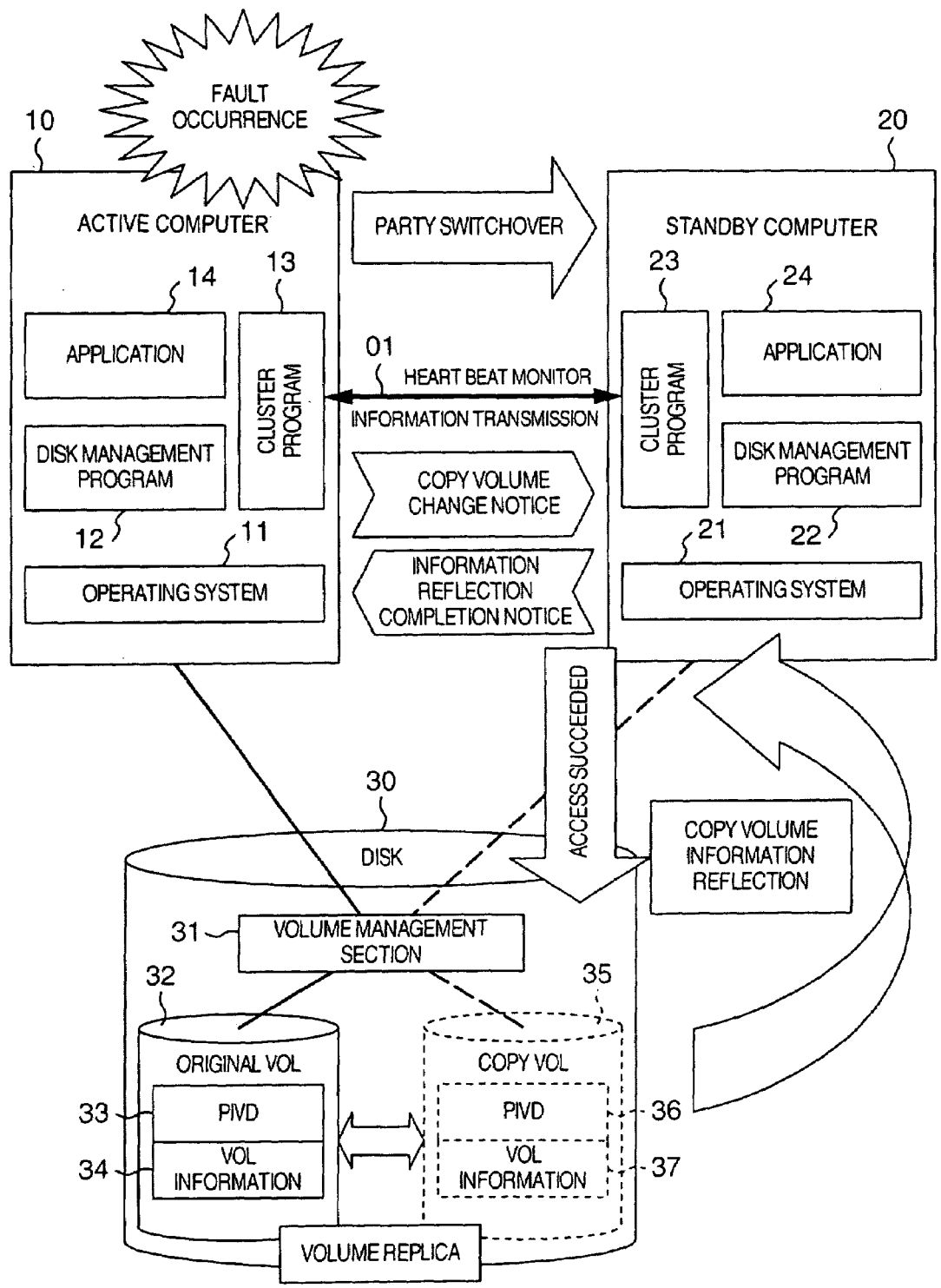
FIG. 1 is a high-level system block diagram showing a active/standby computer system model according to an embodiment of the invention.

Illustrated in FIG. 1 is a block diagram of a active/standby computer model according to the present embodiment.

Figure 2:
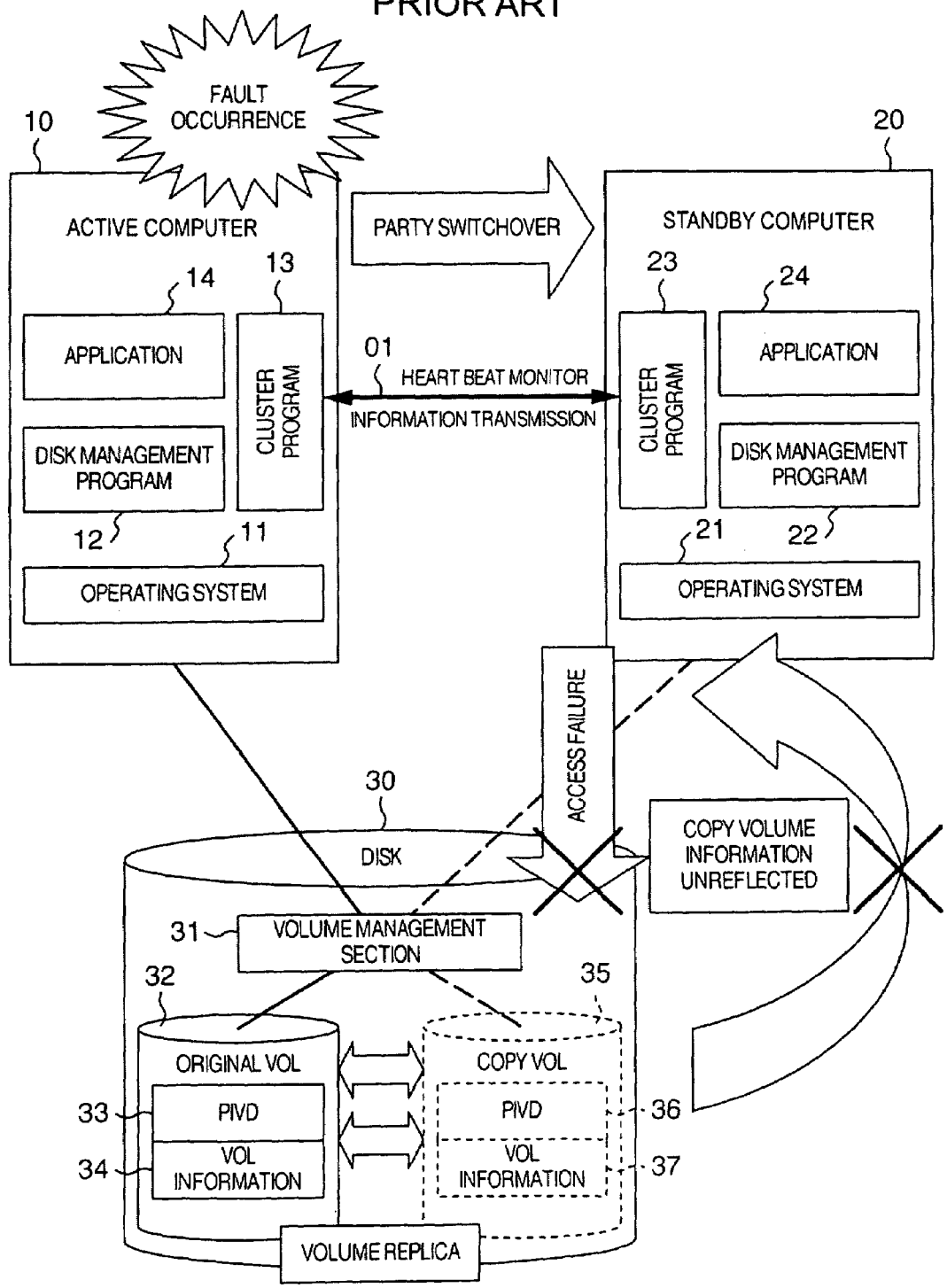
FIG. 2 is a high-level block diagram showing a conventional fault take-over system using a active/standby computer system model.

Illustrated in FIG. 2 is a block diagram of a active/standby computer model based on the conventional technique and having problems to be solved by the present embodiment.

Each of the models as shown in FIGS. 1 and 2 comprises a computer layer for performing processes and a disk layer for saving data necessary for the processes. The computer layer includes a plurality of active computers 10 and a plurality of standby computers 20. Each computer has means 01 for mutual communication. Each of the computers 10 and 20 includes four programs as below: that is, (1) Operating systems (OS's) 11 and 21 for controlling operation of the computers, (2) Disk management programs 12 and 22 for performing disk management, (3) Cluster programs 13 and 23 for realizing a highly utilizable system based on party switchover, and (4) Applications 14 and 24.

Each of the cluster programs 13 and 23 has a function of interchanging mutual information and a fault monitoring function by using the communication means 01. On the other hand, the disk layer includes a disk 30 shared by the host computers. The disk 30 is comprised of two components, that is, (1) VOL's 32 and 35 for saving information and (2) a VOL management mechanism 31 for controlling VOL's in the disk device. The VOL's 32 and 35 have PVID's 33 and 36, respectively, for identifying objects to be accessed from the host computer layers 10 and 20 and VOL information pieces 34 and 37, respectively.

In the technique shown in FIG. 2, (1) a change of copy VOL information on disk due to a VOL replica carried out with the disk 30 in a process by the active computer 10 is not reflected upon the standby computer 20 and therefore, (2) when a fault occurs in the active computer 10 and (3) party switchover is effected by means of the cluster programs 13 and 23, however, (4) access to a copy VOL 35 fails. Consequently, the process applied by the application 14 on the active computer 10 to the copy VOL 35 cannot sometimes be taken over normally by the application 24 on the standby computer 20.

In FIG. 1, by taking the opportunity of the fact that (1) change of copy VOL information on disk is executed by the disk 30 through VOL replica in a process of the active computer 10, (2) the executed change is informed from the active computer cluster program 13 to the standby computer cluster program 23 by way of the communication means 01. Through this, (3) the right to control the copy VOL 35 is temporarily switched from the active computer 10 to the standby computer 20 and (3) thus changed copy VOL information pieces 36 and 37 are reflected upon the standby computer 20. After the reflection, the active computer 10 regains the right to control the copy VOL 35 and executes a process applied to the copy VOL 35. Since this guarantees consistency of the copy VOL information between the active and standby computers, the process applied to the copy VOL can be taken over in the event that a fault occurs subsequently.

Figure 3:
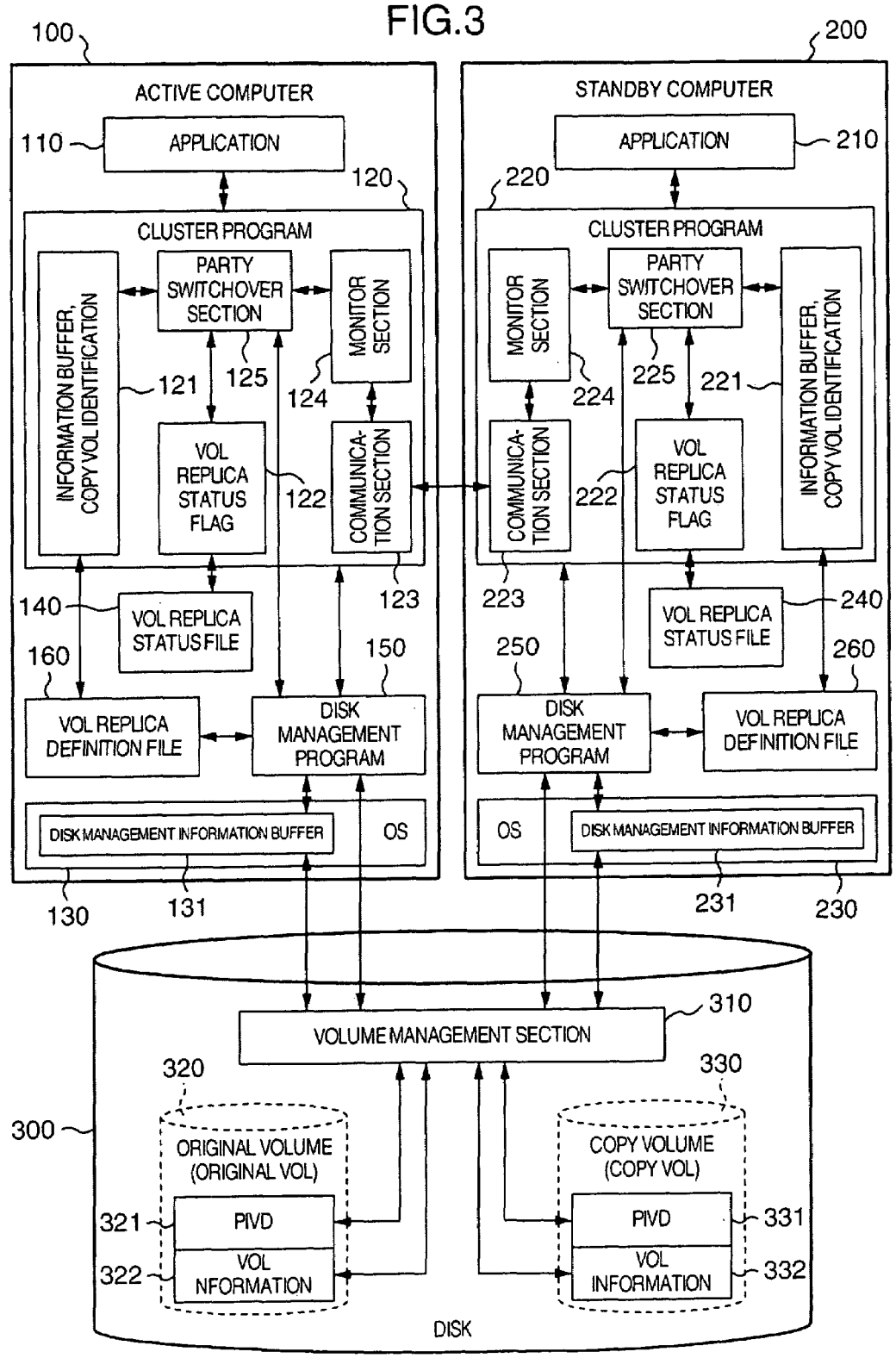
FIG. 3 is a low-level block diagram showing the computer system according to the embodiment of the invention.

Referring to FIG. 3, there is illustrated, in simplified block diagram form, the active/standby computer system according to the present embodiment. Typically, the system of FIG. 3 comprises two components, that is, (1) a computer layer including a plurality of application computers (corresponding to 10 and 20 described previously) and (2) a disk layer for saving data shared by the computer layer (corresponding to 30 described previously). In FIG. 3, for clarity of description, individual programs are labeled by numerals of three figures. In numbering, a numeral of the same two lower figures is used for the same program in the active and standby computers and the location of hundred is "1" for designating the active computer and "2" for designating the standby computer. In the following, individual programs will first be described. In description, the programs of the respective computers are described by making reference to only program numbers on the active computer with the intention of also giving a description of the corresponding programs on the standby computer.

A disk 300 includes a volume management section 310 and original and copy VOL's 320 and 330 subjected to VOL replica, the original and copy VOL's (320 and 330) having PVID's (321 and 331) for identification of these VOL's, respectively, and VOL information pieces (322 and 332) necessary for access to the VOL's, respectively.

The volume management section 310 functions to execute the VOL replica and change the PVID's (321 and 331) and VOL information pieces (322 and 332) of original VOL 320 and copy VOL 330. Management information the volume management section 310 has is shown in, for example, FIG. 15. For original and copy VOL's 1501 and 1511, the management section 310 holds storage positions 1502 and 1512 of PVID's and storage positions 1503 and 1513 of VOL information pieces while mutually associating the individual storage positions. When a request is made to the volume management section for accessing the PVID's and VOL information pieces of the original/copy VOL's, the PVID's and VOL information pieces are read out of the respective corresponding storage positions to respond to the request. Here, the information held in the management section is set to the storage positions of PVID's and VOL information pieces but the PVID's and VOL information pieces per se may be held. The VOL information may include identifiers for identification of volumes in addition to the PVID's. Alternatively, the information held in the management section may be held in a disk management program 150 or disk management information buffer 131, thereby ensuring that the management program 150 can change the PVID's and VOL information pieces of original/copy VOL's through the medium of the volume management section 310.

An active computer 100 includes an OS 130, a cluster program 120, the disk management program 150, an application 110, a VOL replica definition file 160 and a VOL replica status file 140.

Figure 14:
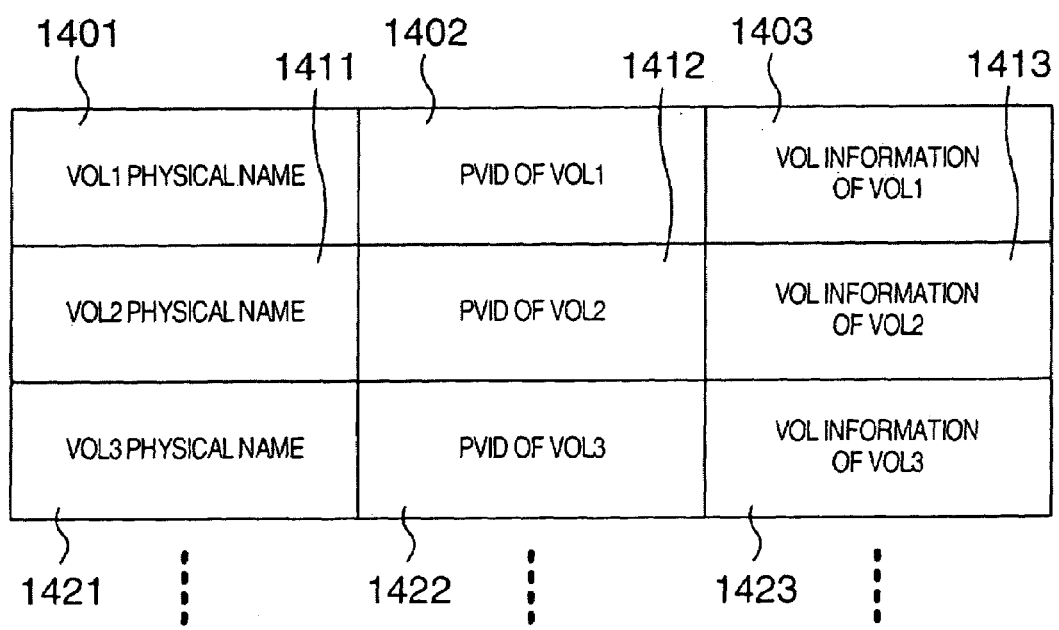
FIG. 14 is a table showing an example of information contained in a disk management information buffer.

The OS 130 includes the disk management information buffer 131. The OS 130 also intervenes in access from the disk management program 150 to the disk 300. In this access, the result of access is sometimes saved in the disk management information buffer 131 and in some applications, the information saved in the buffer 131 is utilized without accessing the disk 300. The pieces of information held by the disk management information buffers 131 and 231 are shown in, for example, FIG. 14. Each of the buffers 131 and 231 includes physical names 1401, 1411 and 1421 of VOL's, PVID's 1402, 1412 and 1422 of the VOL's and VOL information pieces 1403, 1413 and 1423 of the VOL's. Physical name 1401 of a certain VOL 1 makes the correspondence with VOL1 PVID information 1402 indicative of a PVID of the VOL1 and with VOL information 1403 of the VOL1. Physical names of other VOL's also make the correspondence with corresponding PVID's and VOL information pieces.

Figure 13:
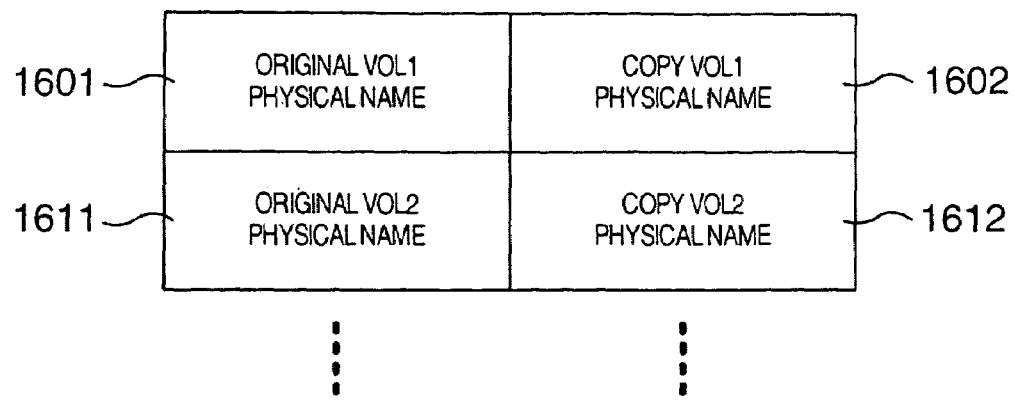
FIG. 13 is a table showing an example of information contained in a VOL replica definition file.

The VOL replica definition file 160 includes definitions necessary for execution of a VOL replica and is constructed of a table as shown in, for example, FIG. 13, including physical names of the original VOL 320 and copy VOL 330 subjected to replica. The replica is applied to an original VOL and a copy VOL to be paired with each other and in FIG. 13, physical names of original VOL's and copy VOL's constituting individual pairs are stored while making the correspondence between original and copy VOL's in the individual pairs. For example, in FIG. 13, original VOL 1601 and copy VOL 1602 are paired as indicated.

The disk management program 150 has programs for accessing the disk 300 executable on the active computer 100, for example, including a program for lock control of VOL's, a program for acquisition of PVID's and VOL information of VOL's and a VOL replica execution program. During execution of these programs, the program 150 sometimes commands the volume management section 310 or reads the disk management information buffer 131. Further, the VOL replica execution program sometimes utilizes the VOL replica definition file 160.

The cluster program 120 has a copy VOL identification information buffer 121 adapted to save information for identifying copy VOL's subjected to a VOL replica, a VOL-replica status buffer 122 adapted to hold the execution status of the VOL replica, a communication section 123 adapted to make communication with the other party, a monitor 124 adapted to provide a function of monitoring states of the self and other parties, and a switchover section 125 adapted to perform a process concerning the party switchover. The copy VOL identification information buffer 121 is a buffer for holding identification information of a copy VOL read out of the VOL replica definition file 160 and is constructed of the table shown in FIG. 13, including physical names of the original and copy-VOL's 320 and 330 subjected to the replica.

The monitor 124 has a function of detecting a fault of the party of its own and the execution of an MRCF (replica creating process) by monitoring the application 110, a function of informing a state of the self-party by communicating with the communication section 223 of cluster program 220 of the standby computer through the medium of the communication section 123 and a function of detecting a faulty state of the other party and a VOL replica status.

The switching unit 125 has a party switchover function for performing switching between the active computer and standby computer in accordance with faults in the self and other parties detected from the monitor 124. The switchover section 125 also has a function to respond to detection of VOL replica execution statuses of the self and other parties from the monitor 124 so as to control execution of the VOL replica through the medium of the disk management program 150, a function to hold the statuses in the VOL replica status flag 122 and VOL replica status file 140, and a function to inform the application 110 utilizing the VOL replica that the use of the copy VOL is to be stopped/resumed. Further, the switchover section 125 also has a function to read the VOL replica definition file 160 and hold information necessary for identifying a copy VOL 330 in the copy VOL identification information buffer 121.

It is to be noted that a computer of the active computer can function to fulfill, for example, the switching unit by executing a predetermined program in the computer.

The program for making the active computer, standby computer and disk device function as the switching unit or the like is recorded on a recording medium such as CD-ROM and stored in a magnetic disk, for instance, and thereafter loaded on the memory so as to be executed. The recording medium for recording the program may be other recording media than the CD-ROM. In an alternative, the program may be installed from the recording medium to the information processing apparatus and then used or may be used by accessing the recording medium through a network.

Figure 4:
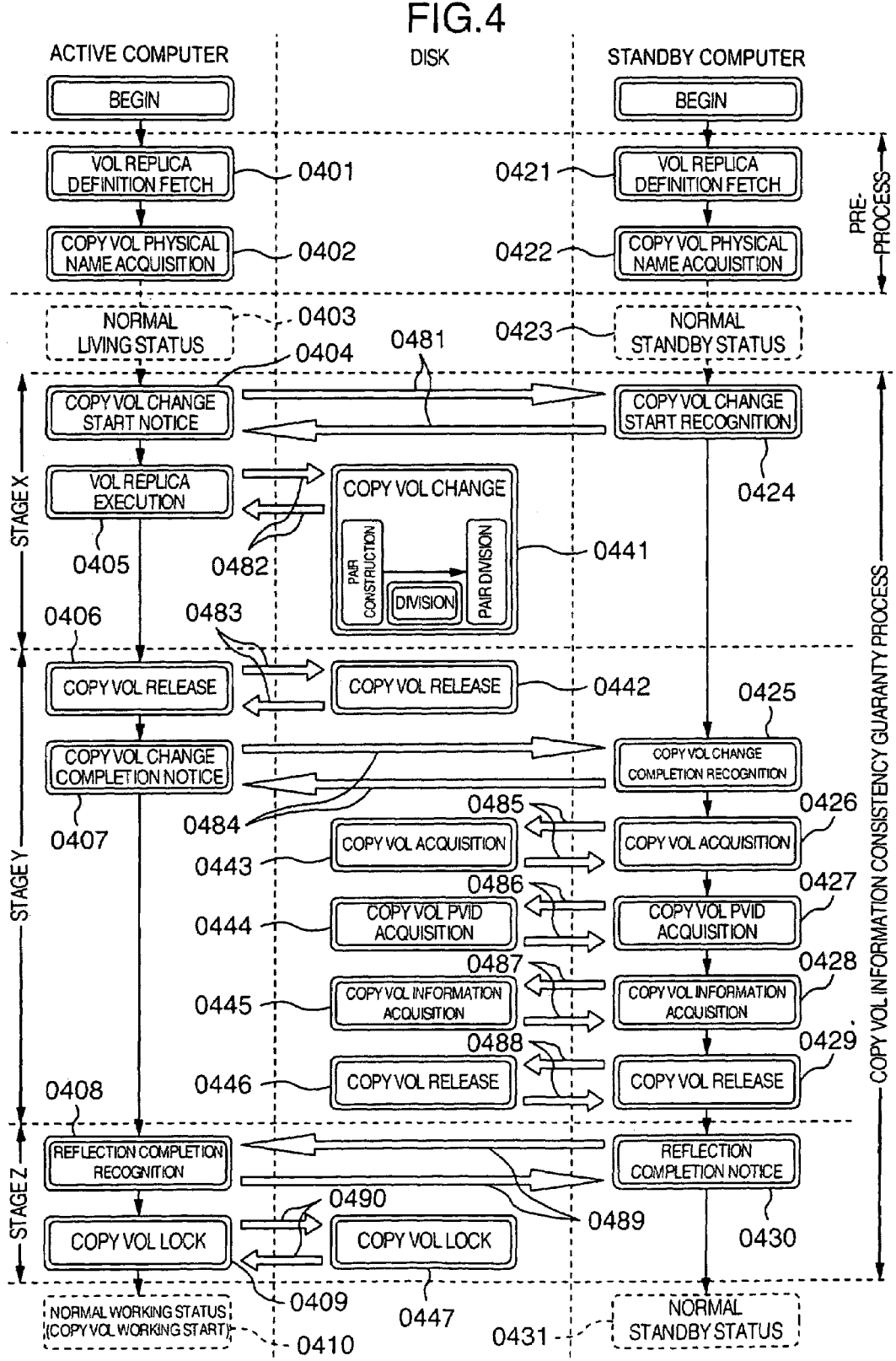
FIG. 4 is a flowchart illustrating the outline of procedures in the active/standby computers when the active computer carries out pair division of volume replica process in the computer system according to the embodiment of the invention.

FIG. 4 and ensuing figures illustrate flows of processes. For avoidance of confusion with numerals in FIG. 3, numerals of four figures are used in each drawing. Reference numerals in FIGS. 4 to 12 have each two upper figures corresponding to the figure number and two lower figures including 01 to 20 indicative of process steps on the active computer, 21 to 40 indicative of process steps on the standby computers and 41 to 60 indicative of process steps on the disk device. Further, data interchange process steps carried out between each computer party and the disk device are designated by two lower figures 80 to 99. It will be appreciated that in the following description, even when a description is given by way of the process steps in the active computer, corresponding process steps in the standby computer will sometimes be carried out similarly unless noted specifically.

Figure 5:
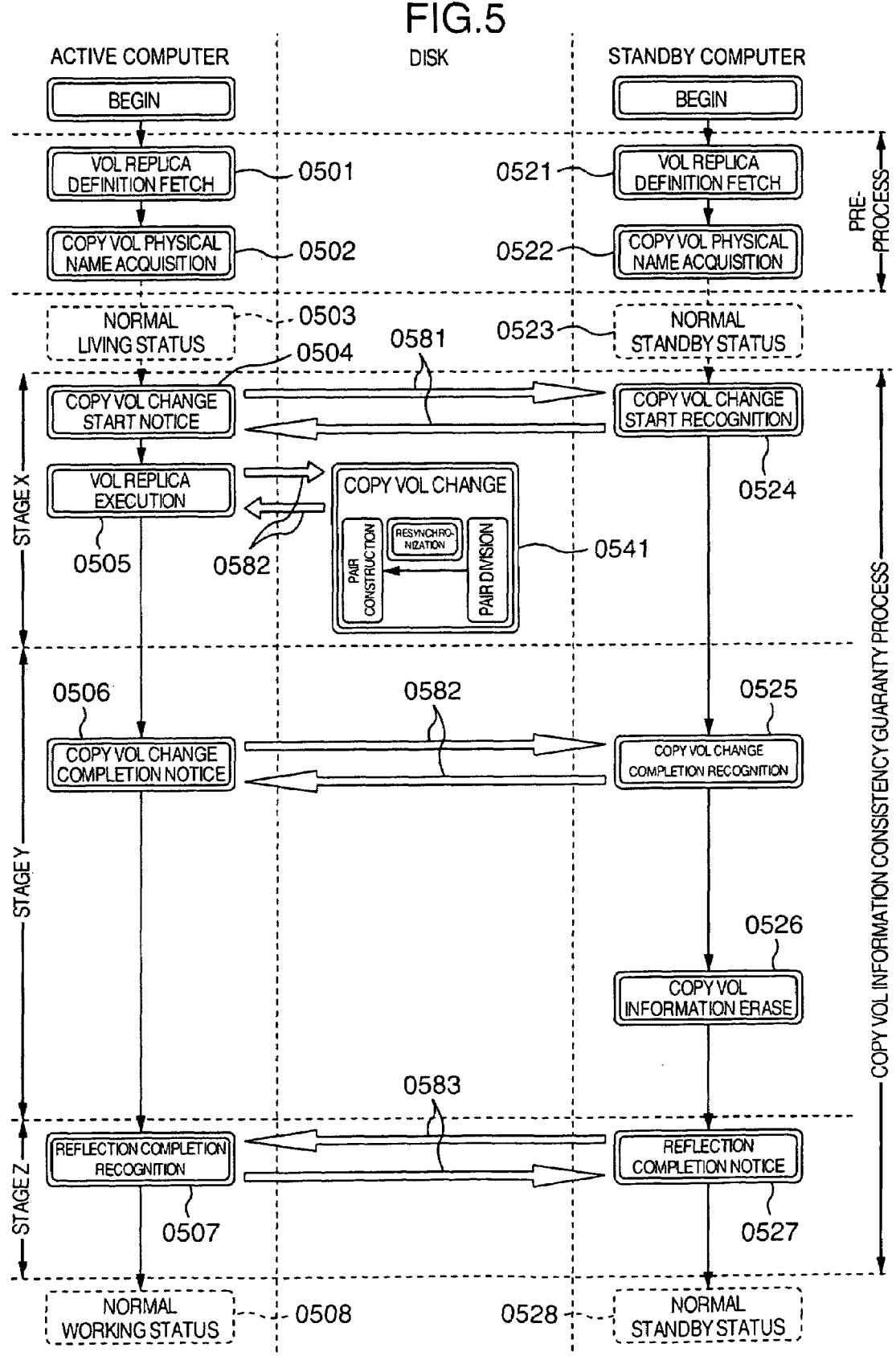
FIG. 5 is a flowchart illustrating the outline of procedures in the active/standby computers when the active computer carries out pair reconstruction of volume replica process in the computer system according to the embodiment of the invention.

Illustrated in FIGS. 4 and 5 are simplified flowcharts of processes in the active/standby computers model according to the present embodiment, with FIG. 4 indicating an instance where the pair division of VOL replica means is executed and FIG. 5 indicating an instance where the pair reconstruction of VOL replica means is executed.

In FIG. 4 or 5, the process flow is divided into two major phases, that is, (1) a pre-process phase in which information necessary for performing the copy VOL information reflection process is processed before execution of VOL replica and (2) a copy VOL information consistency guaranty process phase including execution of the VOL replica means in the active computer. Details of each phase will be described sequentially by making the correspondence with the system block diagram of FIG. 3.

The pre-process is common to FIGS. 4 and 5 which the active and standby computers first carry out in common pre-process. In the pre-process, a VOL replica definition is first read (0401). This includes a step in which the cluster program 130 on the active computer 100 reads the VOL replica definition file 160. From this definition file, a physical name of a copy VOL subjected to a VOL replica is acquired (copy VOL physical name acquisition step 0402). Up to here, the pre-process ends and the active computer 100 executes a process not applied with the present embodiment until the copy VOL changes, thus typically continuing to a normal active state 0403.

Subsequently, when the copy VOL change is started, the aforementioned consistency guaranty process phase is executed. The consistency guaranty phase includes three stages in total, that is, (1) stage X representing a copy VOL change stage for executing the VOL replica with the active computer, (2) stage Y representing a copy VOL change reflection stage for reflecting copy VOL information changed in the stage X upon the standby computer, and (3) stage Z representing a copy VOL working resumption stage for resuming working of the copy VOL.

The pre-process is common to FIGS. 4 and 5 but in the copy VOL information consistency guaranty phase, the contents of change of the copy VOL information in stage X differs for FIGS. 4 and 5 and besides, in the copy VOL information reflection process of stages Y and Z, accesses to the copy VOL and lock of copy VOL are needed. Therefore, different steps are carried out in FIGS. 4 and 5.

The processing flow in the individual stages will now be described in sequence.

In the stage X, when a change of a copy VOL is first executed by means of the disk management program 150, this change is informed to the switchover section 125 on the cluster program 120 (copy VOL change notice 0404). By receiving this notice, the switching unit 125 informs the cluster program 220 of standby computer 200 that the copy VOL change is executed, through the medium of monitor 124 and communication section 123 (rightward arrow 0581). The standby computer 200 receives the notice 0581 at the switchover section 225 through the medium of the communication section 223 and monitor 224 on the cluster program 220 and recognizes that the copy VOL change process is executed in the active computer 100 (copy VOL change start recognition step 0524). After the recognition, the standby computer 200 informs the active computer 100 of the recognition through a route inverse to the route through which the execution is informed from the active computer 100 to the standby computer 200 (leftward arrow 0581) and waits for reception of a notice to the effect that the copy VOL change is completed.

Next, when the active computer 100 receives, at the switching unit 125, the recognition notice leftward arrow 0581 from the standby computer, it returns the process to the disk management program 130 to execute a step accompanying the copy VOL change (VOL replica execution 0405). This step is taken over to the volume management section 310 on the disk device 300 through the OS 130 or the disk management buffer 131 on the OS. The management section 310 acquires the right to control the copy VOL and executes the following steps. Firstly, in the case of pair construction 0541 in FIG. 5, the management section 310 informs the active computer that the a PVID 331 of the copy VOL 330 is changed to have the same value as a PVID 321 of the original VOL 330 and informs the active computer that the step is completed (arrow 0582). On the other hand, in the case of pair division in FIG. 4, the management section 310 changes, to another unique value, the value of PVID 331 of the copy VOL made to be equal to the value of PVID 321 of the original VOL by means of the pair construction, changes the VOL information 332 of the copy VOL from the value prevailing before the execution of pair construction and informs the active computer of information indicative of end of the step (arrow 0482).

Through the steps in the stage X as above, the execution of the copy VOL change step in the active computer can advantageously be informed to the standby computer. This brings about an advantage that when a fault occurs in the active computer before the standby computer recognizes the copy VOL change completion, the standby computer can recognize whether the change step has been executed, thereby permitting the self-party to recognize a process to be taken over after the occurrence of the fault.

Subsequent to the stage X, the stage Y and ensuing stage are executed, in which steps are different for the pair division mode (FIG. 4) and the pair construction mode (FIG. 5). The steps will now be detailed in sequence of FIGS. 4 and 5. The step of stage Y is initiated by taking the opportunity of the fact that the monitor of the active computer detects the notice transmitted from the disk device in 0482 (or 0582).

In the case of pair division (FIG. 4), the active computer 100 releases the right to control the copy VOL 320 acquired during the VOL replica step 0405 in order to enable the standby computer 200 to execute a process applied to the copy VOL 320 (copy VOL release 0406). In this step, the switching unit 125 calls, through the management program 130, the management section 310 to enable it to release the right to control the copy VOL acquired in the VOL replica step 0405 (rightward arrow 0483). The management section 310 releases the right to control the copy VOL 320 (copy VOL release 0442) to complete this step.

As the copy VOL release step 0406 ends, a copy VOL change completion notice step 0407 is executed in which the switching unit 125 of active computer 100 informs the switching unit 225 on standby computer 200 of the completion of the copy VOL change through the medium of a path similar to that used during the notice of execution (rightward arrow 0484). After confirming that the standby computer has received the copy VOL change notice, the active computer 100 ends the copy VOL change notice step 0407 and waits for the standby computer to complete reflection of the changed copy VOL information. It will be appreciated that in the copy VOL change completion notice step 0407, the information to be notified may include information (hereinafter referred to as information 1) for identifying the copy VOL whose copy VOL information (such as PVID) is changed in the step 0441. The information 1 can be a physical device name of the copy VOL or an identifier for a pair constituted by the copy VOL in FIG. 13 or information (hereinafter referred to as information 2) for indicating whether the copy VOL change step in 0441 is concomitant with the pair division or pair construction ((or information for identifying whether the reflection step of the copy VOL information to be executed by the standby computer in the stage Y is "acquisition of a newly assigned PVID (corresponding to 0427 in FIG. 4)" or "erase of the PVID (corresponding to 0526 in FIG. 5)). Here, the information 1 and information 2 may be transmitted to the standby computers at the timing different from that for copy VOL change completion notice. In this case, too, by taking the opportunity of detection of the copy VOL change completion notice 0482 (or 0582) from the disk device or detection of the copy VOL release completion notice (0483) from the disk device, the information 1 and information 2 will be transmitted.

The notification of the information 1 permits the standby computer to recognize for which copy VOL the PVID change step (0427, 0526) is to be executed. Also, the notification of the information 2 makes it possible to decide which one of the steps 0427 and 0526 is to be executed.

On the other hand, the switching unit 225 on standby computer 200 receiving the copy VOL change notice recognizes that the copy VOL change has been carried out in the active computer (copy VOL change completion recognition step 0425), carries out a step of updating the VOL replica status flag and performs, through the disk management program 230, a step of reflecting the copy VOL information.

The step of updating the VOL replica status flag includes storing information corresponding to flag "B2" and information 2 in a table for managing the VOL replica status flag while making the correspondence between the information and a physical device name of the copy VOL identified by the information 1. Firstly, the right to control the copy VOL is acquired (copy VOL acquisition 0426). The copy VOL acquisition step is carried out in accordance with a processing flow similar to that of the copy VOL release step (arrow 0485, copy VOL acquisition 0443).

After the copy VOL acquisition step 0426, the copy VOL PVID acquisition step 0427 is carried out. In the PVID acquisition step 0427, the switching unit 225 uses the copy VOL physical name acquired in the pre-process step 0442 to execute the disk management program 250. The program 250 calls the volume management section 310 on the disk device 300 directly without routing through the disk management information buffer 231 on the OS (leftward arrow 0486), and the management section 310 reads a PVID 331 of the copy VOL 330 (copy VOL PVID acquisition 0444) and returns it (rightward arrow 0486). Through this, the switching unit 225 acquires the PVID 331 of the copy VOL (copy VOL PVID acquisition step 0427). At that time, the disk management program 250 stores that PVID 331 of the copy VOL acquired in the step 0427 in the disk management information buffer 231.

After the copy VOL PVID acquisition step 0427, a copy VOL information acquisition step 0428 is carried out. In the VOL information acquisition step 0428, the switching unit 225 uses the PVID 331 of copy VOL acquired in the PVID acquisition step 0427 to execute the disk management program 250. The program 250 calls the management section 310 in a process flow similar to that in the step 0427 to acquire VOL information 332 of the copy VOL (arrow 0487, copy VOL information acquisition step 0445). At that time, too, like the step 0427, the disk management program 250 stores the acquired copy VOL information 332 in the disk management information buffer 231.

After completion of the step 0428, the switching unit 225 performs a step of releasing the copy VOL in the same process flow as that in the copy VOL acquisition step 0426 (copy VOL release steps 0429, 0466 and arrow 0488).

On the other hand, in the case of pair construction (FIG. 5), the copy VOL 320 is changed (synchronized) and combined with the original VOL 310 so as to be viewed or recognized as a sole VOL from the active computer 100 and standby computer 200. Accordingly, it is necessary that the standby computer 200 be prevented from accessing the inexistent (invisible) copy VOL prevailing before the change in accordance with a PVID 331 and VOL information 332 of the copy VOL stored on the disk management information buffer thereby to cause an error. Therefore, the active computer 100 informs the standby computer 200 of completion of the copy VOL change through a copy VOL change completion notice step 0506 (arrow 0582). In the step 0506, notice (arrow 0582) and copy VOL change completion recognition step 0525 by the standby computer, processes comparable to those in the step 0407, notice (arrow 0484) and step 0425 are carried out, thus enabling the switching unit 225 on the standby computer 200 to recognize that the copy VOL has been changed.

Having recognized the copy VOL change, the switching unit 225 executes the copy VOL information erase step 0526 representing a step of reflecting the copy VOL information, through the medium of the disk management program 250. In the step 0526, the program 250 applies a process to the disk management information buffer 231 so that the PVID 331 and VOL information 332 of the copy VOL stored on the buffer 231 and placed in the pair division condition may be erased.

In this manner, the copy VOL information reflection stage Y is completed. This brings about an advantage that during the pair division (FIG. 4) in which the copy VOL information changed by the VOL replica executed by the active computer can be reflected upon the standby computer, the standby computer can access the copy VOL and an advantage that during the pair construction (FIG. 5), the standby computer can be prevented from accessing the inexistent (invisible) copy VOL.

The pair construction mode described herein refers to start of replica during which a PVID and VOL information of a copy VOL are changed and the copy VOL is viewed as being concealed from the host layer. Accordingly, only an original VOL is recognizable from the host layer and as a result, access to the original VOL alone is permitted. In the present system, however, write to the original VOL can be reflected upon the copy VOL synchronously or asynchronously.

The pair division mode described herein refers to end of the replica during which the PVID and VOL information of the copy VOL are changed while the contents of the VOL being kept to be conditioned to be the same as that of the original VOL in the pair division mode and the copy VOL is recognizable, from the host layer, as a single VOL separated from the original VOL. The host layer is conditioned as being permitted to issue access requests to the original VOL and copy VOL separately.

After the stage Y, the stage Z is executed. Following the step 0429, the standby computer 200 executes reflection completion notice 0430 and the switching unit 225 of standby computer 200 informs, through a similar path to that used for notifying the execution, the switching unit 125 on active computer 100 that the copy VOL information is reflected upon the standby computer (arrow 0489). The standby computer 200 confirms that the active computer has received the notice and ends the step 0430.

It is to be noted herein that in step 0410, data excepting the PVID and VOL information are sometimes non-coincident between the original and copy VOL'S. The reason for this is as below. After the pair division (copy VOL change step 0401) in which data of the original and copy VOL's are coincident with each other, accessing to the original VOL continues until the step 0410 is executed and as a result, the original VOL will sometimes be updated. In case the coincidence between the original and copy VOL's is needed, update of the original VOL will temporarily be limited between the copy VOL change step 0401 and the step 0410 or, if the limitation is not imposed, synchronization between the original and copy VOL's will sometimes be made before working of the original and copy VOL's is started in the step 0410.

On the other hand, the switching unit 125 of active computer receiving the notice (arrow 0489) recognizes that the copy VOL information is reflected in the standby computer (reflection completion recognition step 0408) and obtains the right to control the copy VOL through the disk management program 150 (copy VOL acquisition 0409). In this manner, the stage Z is completed and the active computer shifts to the normal working status 0410 to start working both the original and copy VOL's whereas the standby computer shifts to a normal standby status 0431.

On the other hand, during the pair construction (FIG. 5), like the step 0430, information reflection completion notice (arrow 0489) and step 0408, the standby computer executes a reflection completion notice step 0527 and an information reflection completion notice 0528 and the active computer executes a reflection completion step 0507 in the active and standby computers 100 and 200. In this manner, the stage Z is completed and the active computer shifts to a normal working status 0508 to continue working of the original VOL whereas the standby computer shifts to a normal standby status 0528.

Through a series of steps as above, both the active and standby computers can advantageously recognize the PVID and VOL information of the copy VOL changed by the VOL replica to guarantee the consistency of information of the copy VOL. Thus, even in the event that a fault occurs since then in the active computer, the standby computer can access the copy VOL to permit normal take-over of business affairs of both the original and copy VOL'S, thereby solving the conventional problems.

Referring now to FIGS. 6 to 12, there are illustrated flowcharts showing details of process flows in the present embodiment. In the following description, when both the active and standby computers engage in processes, the process by the active computer is indicated on the left side and the process by the standby computer is indicated on the right side. Individual steps in the figures will be described by making the correspondence with the steps in FIGS. 3 to 5 but for simplicity of description, the steps appearing in the description given in connection with FIGS. 3 to 5 will sometimes be omitted in the following.

Figure 6:
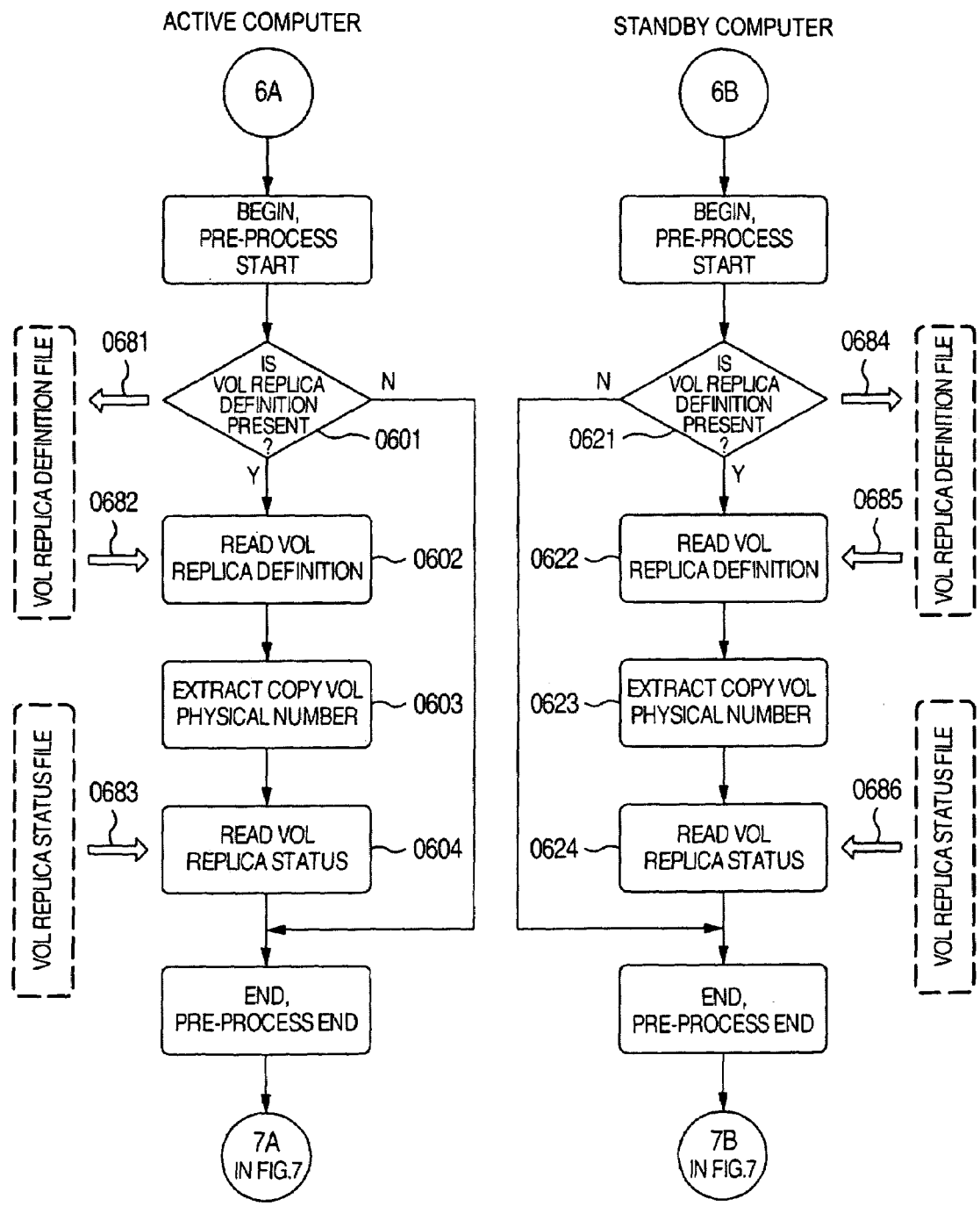
FIG. 6 is a flowchart of a pre-process in the active/standby computers.

Flowcharts as shown in FIG. 6 depict details of the aforementioned pre-processes executed by the active and standby computers. Since the pre-processes carried out in the active and standby computers are similar to each other, the pre-process by the active computer will be described in the following.

Firstly, step 0601 for confirming the presence or absence of a VOL replica definition file is carried out to access the VOL replica definition file 160 (arrow 0681). In the absence of the file, the VOL replica process is not executed and therefore any special step need not be done, thus ending the pre-process.

On the other hand, in the presence of the file, the file 160 is read (step 0602, arrow 0682) and step 0603 of acquiring a physical name of a copy VOL subjected to a VOL replica is carried out. Here, the step 0602 corresponds to the aforementioned step 0401 and the step 0603 corresponds to the aforementioned step 0402.

Further, a VOL replica status is read out of the VOL replica status file 140 and is stored in the VOL replica status flag 122 (step 0604, arrow 0683). This is because when the cluster program is restarted in the course of execution of the VOL replica, it is necessary to recognize whether copy VOL information needs to be reflected upon the standby computer. Here, the VOL replica status file and VOL replica status flag can be managed by means of such a table as a replica status management table shown in FIG. 16. In FIG. 16, in column 1600 of pair identifier, values of an identifier for identifying a pair constructed of an original VOL and a copy VOL are stored. Then, physical device names of the original VOL and copy VOL constituting the pair are stored in column 1601 of original VOL physical name and column 1602 of copy VOL physical name, respectively. Further, flags indicative of the states in the active and standby computers related to changes of PVID of copy VOL are stored in column 1603 of active computer status flag and column 1604 of standby computer status flag, respectively. In addition, information indicating whether the status of execution of replica applied to each pair is pair division or pair reconstruction is stored in column 1605 of division flag. In FIG. 16, for example, a pair designated by pair identifier "1" indicates that this pair is constructed of an original VOL having a physical name of "hdisk0" and a copy VOL having a physical name of "hdisk100". Then, it is indicated that the status flags in the active and standby computers are "A1" and "B1", respectively, and the execution status of replica is "pair division" in relation to the copy VOL "hdisk100".

It is to be noted that FIG. 16 is illustrative of the active computer status flag and standby computer status flag managed by the same table but tables may be employed which manage these flags separately. In this case, the replica status management table consists of two kinds of tables of which one eliminates either the column 1603 of active computer status flag or the column 1604 of standby computer status flag in FIG. 16.

Figure 7:
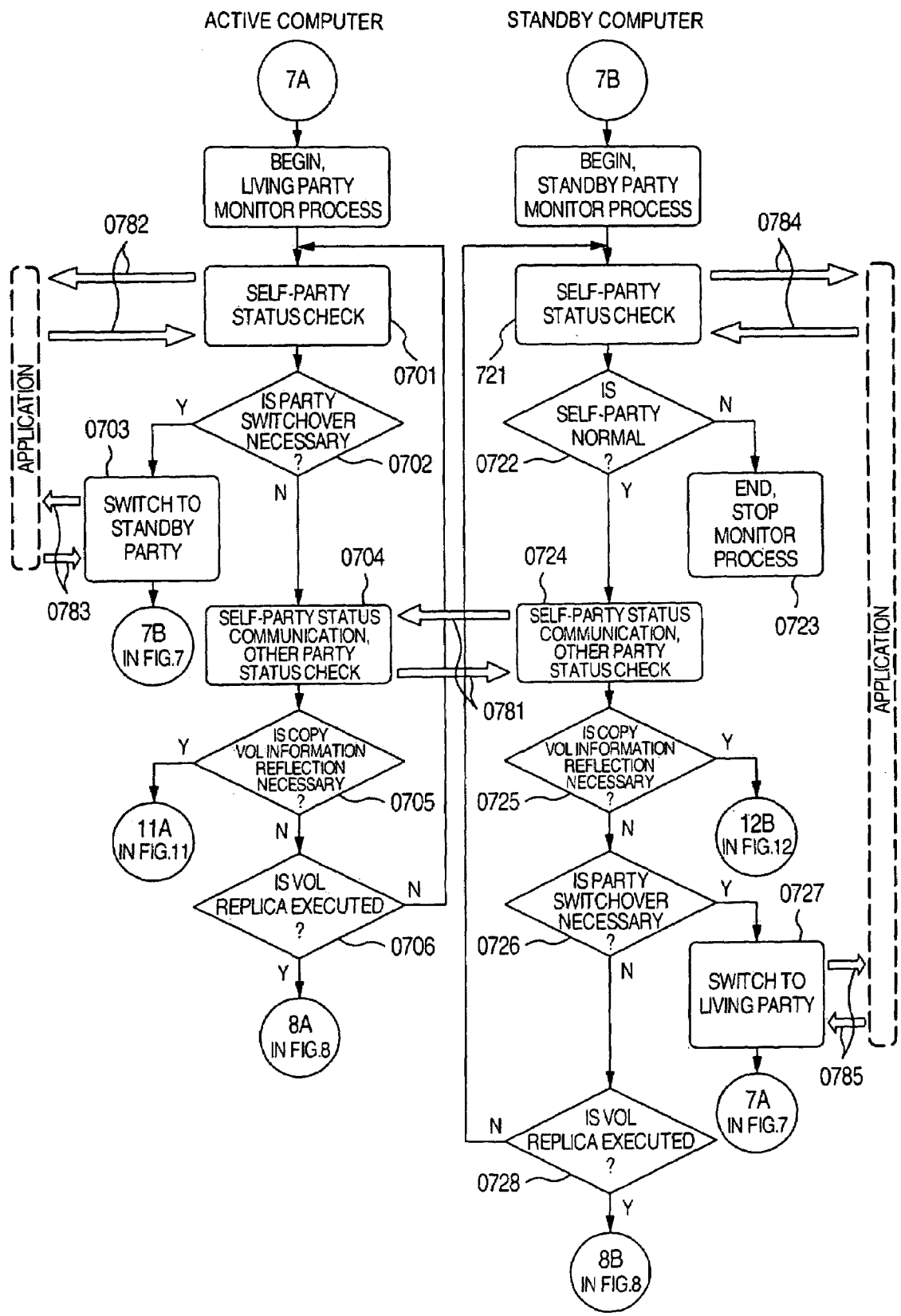
FIG. 7 is a flowchart of a fault monitor and party switchover process in the active/standby computers.

Through the above, the pre-process ends, thus shifting to the normal active state 0403 (7A in FIG. 7).

Illustrated in FIG. 7 is a flowchart indicative of how the conventional fault monitor process and party switchover process based on the cluster program is related to the VOL replica/copy VOL information consistency guaranty process. The process referred to herein corresponds to the normal working status of active computer (step 0410 or 0508) and the normal standby status of standby computer (step 0431 or 0528) in FIG. 4 or 5.

In FIG. 7, the cluster program 120 on active computer 100 first checks the status of the self-party by means of the switching unit 125 (step 0701) and decides whether the party switchover is necessary (step 0702). The self-party status check step 0701 includes communication made between the cluster program 120 and the application 110 (arrow 0782). The communication 0782 includes information as to whether there occurs an application fault, which requires the party switchover, or a request for execution of VOL replica from the application.

In case the party switchover is determined to be necessary in the step 0702, the cluster program 120 informs the application 110 that the process is to be interrupted for the purpose of fulfilling the party switchover (arrow 0783) and the process is switched to the standby computer by means of the switching unit 125 (step 0703). Thereafter, since the computer party serving as the former active computer 100 has been switched to the standby computer, the cluster program 120 executes the monitor process in the standby computer (7B in FIG. 7).

On the other hand, if the party switchover is not necessary, the switching unit 125 communicates with the switching unit 225 of standby computer 200 through the monitor 124 and 224 and the communication sections 123 and 223 (arrow 0781) to communicate the self-party (active computer) status and check the status of the other party (standby computer) (step 0704). At that time, the communication 0781 includes interchange of information consisting of the VOL replica status flag 122 or the like managed in the format of the replica status management table. The reason for this is as below. By watching the VOL replica statuses of the self and other parties, both the parties can recognize whether the copy VOL status is changed/reflected and therefore, when the party switchover takes place or a standby computer is newly added during the VOL replica, it can be decided whether reflection of the copy VOL information is necessary. Also, in the event that the other party becomes faulty and fails to communicate in the communication 0781, by some kind of failures the other party is considered as being conditioned to fail to make a decision and the process proceeds to the following step. It is also to be noted that in the following description, when either the cluster programs or the switching units of the active and standby computers are so described as to communicate with each other, a process similar to the communication 0781 is carried out even if not noted specifically.

To add, the information such as replica status flag acquired from the other party in the step 0704 is stored in the replica status management table (FIG. 16) of the self-party. For example, when the standby computer acquires from the active computer a active computer status flag "B2" the active computer holds in relation to a pair indicated by a pair identifier of "2", the value "B2" is stored at a row corresponding to the pair identifier "2" in replica status flag in the column 1603 of active computer status flag held by the standby computer.

Subsequently, the switching unit 125 decides whether the copy VOL information reflection is necessary (step 0705). The reason for this is as below. In the normal state, the active computer carries out the copy VOL information change process (steps 0801 to 0804 in FIG. 8) and the standby computer carries out the copy VOL information reflection process (steps 0921 to 0929 in FIG. 9) but for example, after the party switchover due to a fault in the active computer is done, there is a possibility that in the former standby computer now acting as the active computer, the party switchover has been done without performing the copy VOL information reflection process. Accordingly, in the step 0705, it is decided whether the status flag of each party is "0" and if the status flag of any one of the parties is not "0", implying that the party switchover is done during the copy VOL change (or during copy VOL information reflection process), the copy VOL information reflection process is determined to be necessary.

Figure 11:
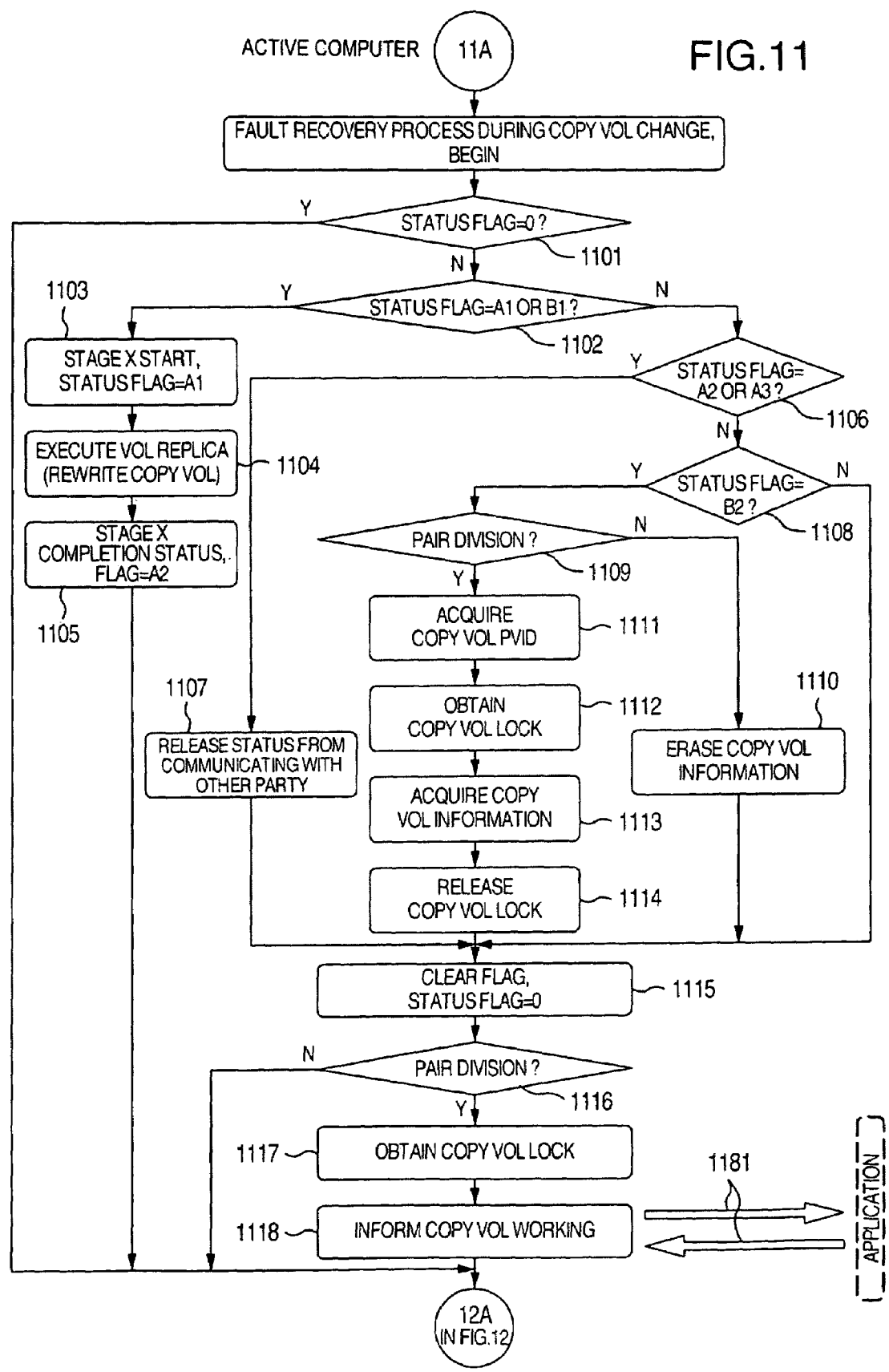
FIG. 11 is a flowchart illustrating procedures for the active computer to take over the copy volume replica process and copy volume in the event of the occurrence of a fault.

In case the copy VOL information reflection process is determined to be necessary in the step 0705, the cluster program 120 executes a copy VOL reflection process in the fault recovery mode (11A in FIG. 11). If unnecessary, the cluster program 120 decides, in accordance with the presence or absence of the VOL replica execution request confirmed in the step 0782, whether the VOL replica needs to be executed (step 0706). When the step 0706 determines the necessity of execution, the cluster program 120 executes the VOL replica execution process (8A in FIG. 8). If unnecessary, the cluster program 120 again returns to the self-party check process 0701 to continue the process.

Next, the cluster program 220 on standby computer 200 first checks the status of self-party similarly to the step 0701 (step 0721, arrow 0784) to decide whether the self-party is normal (step 0722). If the step 0722 determines the self-party to be abnormal, the switching unit 225 on the cluster program 220 stops and ends the monitor process (step 0723).

On the other hand, if the self-party is normal, the switching unit 225 communicates with the active computer 100 through the communication 0781 (step 0724). Subsequently, the cluster program 220 decides whether the copy VOL information reflection is necessary (step 0725). This step is provided for the same reason as that of the provision of the step 0705 and it is decided in the step 0725 similarly to the step 0705 whether the status flag of each party is "0" and if the status flag of any one of the parties is not "0", implying that the party switchover has been done during the copy VOL change (or during the copy VOL information reflection process), the copy VOL information reflection process is determined to be necessary.

Figure 12:
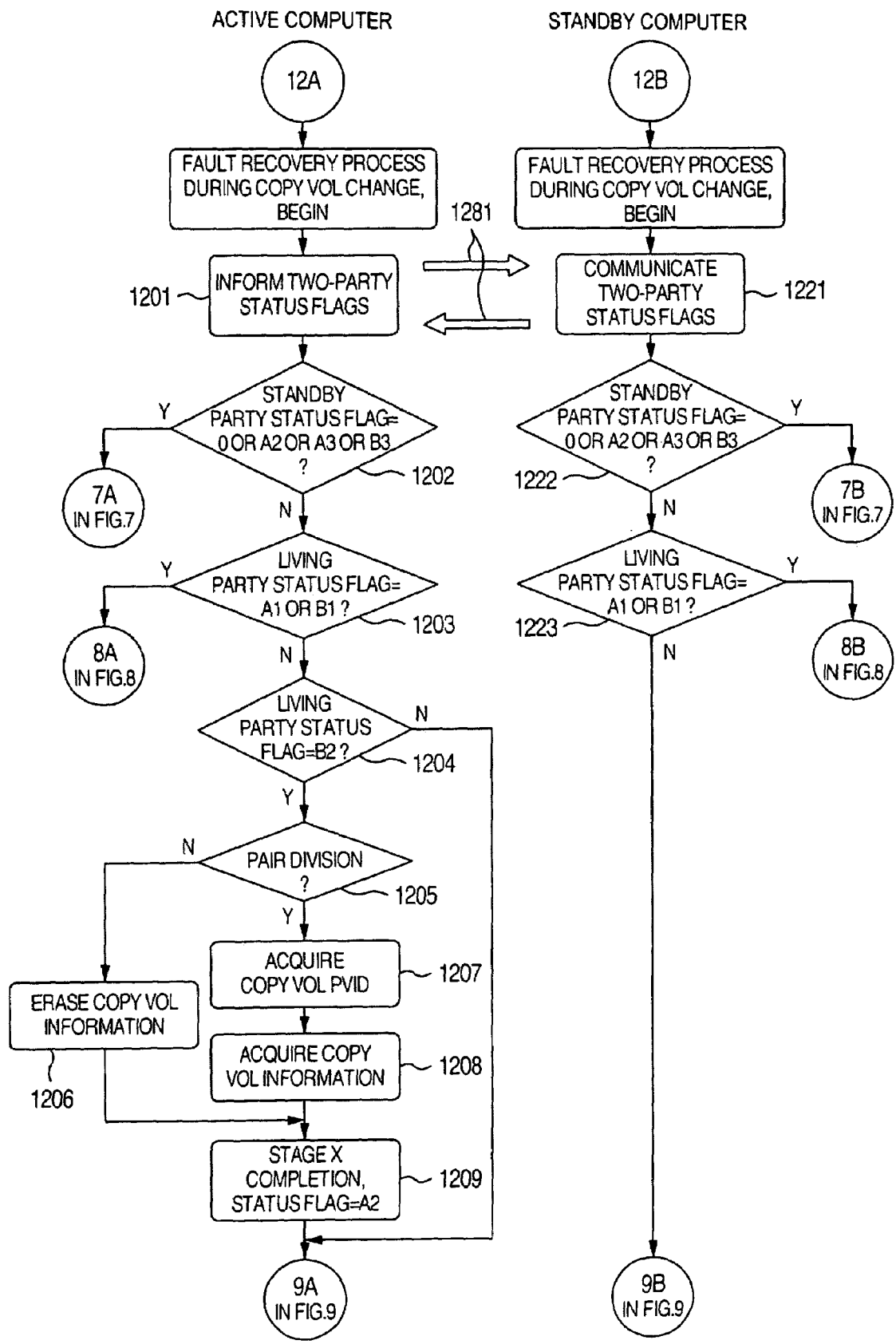
FIG. 12 is a flowchart illustrating procedure for the active computer to hand over to the standby computer the volume information taken over by the active computer during the occurrence of a fault.

When the copy VOL information reflection is necessary, the cluster program 220 executes the copy VOL reflection process in the fault recovery mode (12B in FIG. 12). If unnecessary, the switching unit 225 decides, in accordance with the status of active computer 100 acquired in the communication 0781, whether the party switchover is needed (step 0726). In case the party switchover takes place, the cluster program 220 informs the application 210 of it (arrow 0785) and the party switches to the active computer (step 0727). Further, the cluster program 220 executes the process of monitoring the active computer (7A in FIG. 7). On the other hand, if the party switchover is unnecessary, the cluster program 220 decides, in accordance with the presence or absence of the execution of VOL replica in the active computer acquired through the communication 0781, whether the VOL replica is executed in the active computer (step 0728). If the execution is to be done, the cluster program 220 executes the VOL execution process (8B in FIG. 8) but if unnecessary, the process again returns to the step 0721 to continue.

Figure 8:
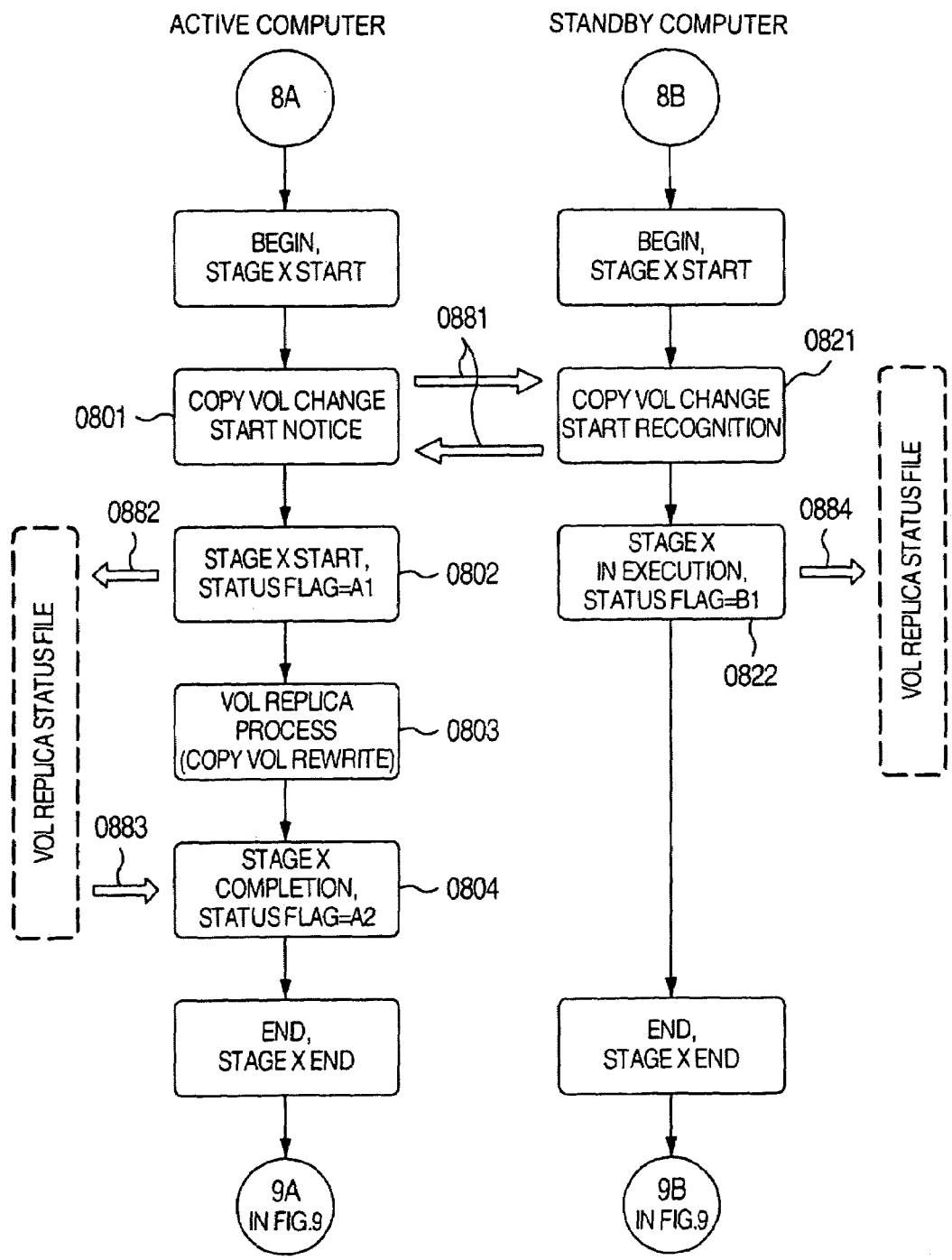
FIG. 8 is a flowchart in the active/standby computers illustrating procedures for the active computer to execute and complete the volume replica process.
Figure 9:
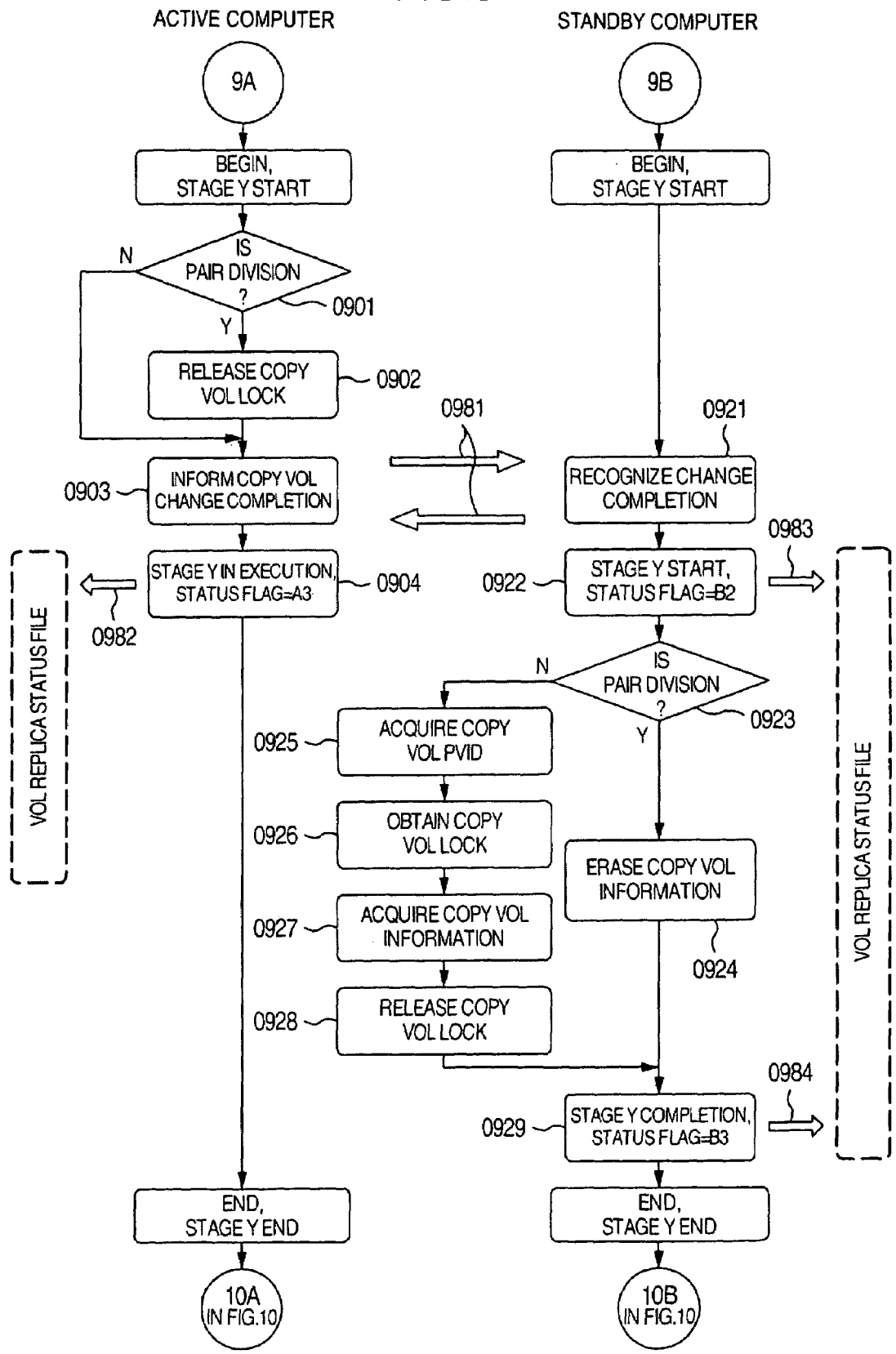
FIG. 9 is a flowchart in the active/standby computers illustrating procedures for the standby computer to execute and complete a process of reflecting changed copy volume information.
Figure 10:
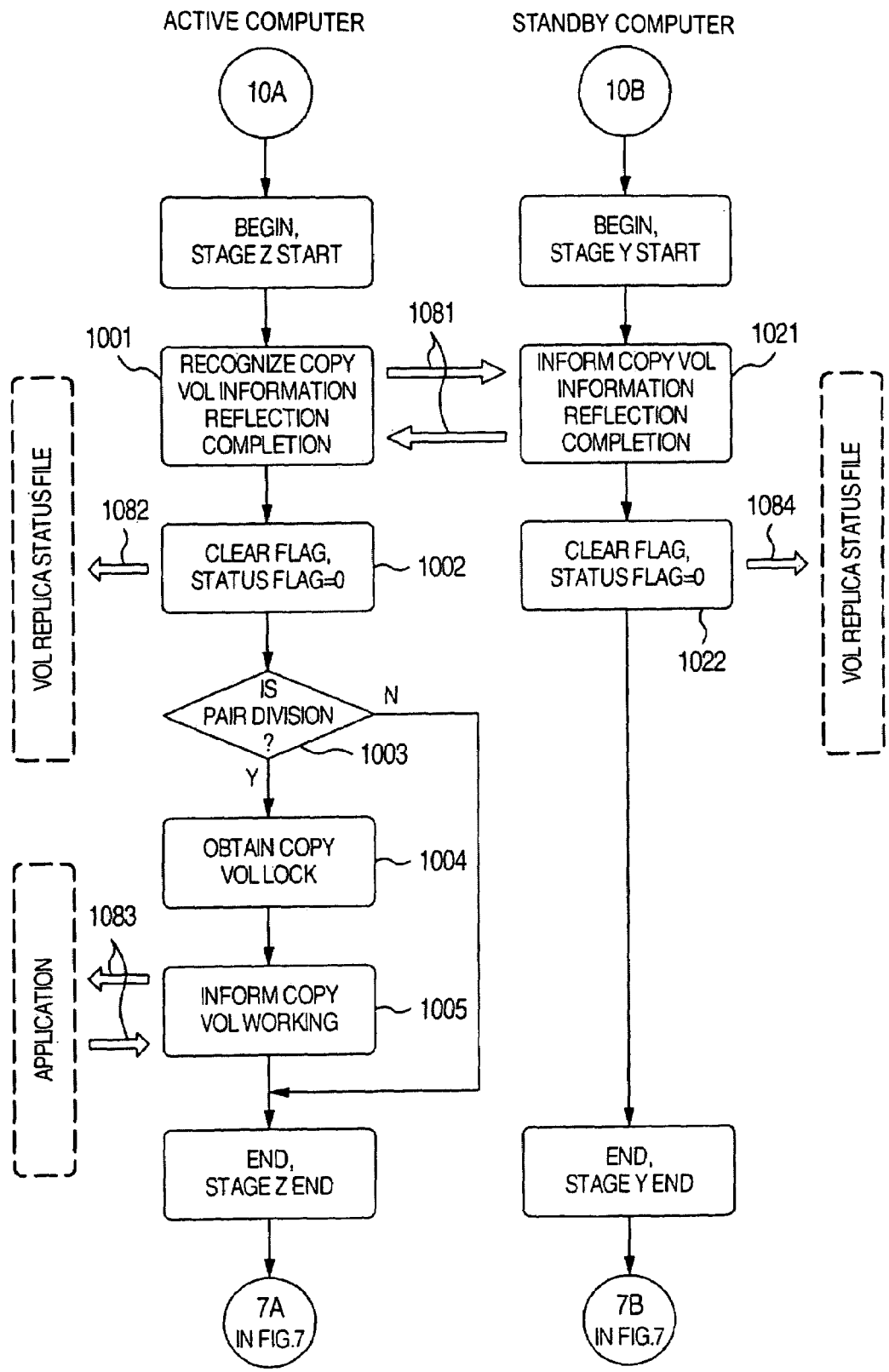
FIG. 10 is a flowchart illustrating procedures for returning to the fault monitor and party switchover process after the reflection of the copy volume information in the active/standby computers.

Illustrated in FIGS. 8, 9 and 10 are flowcharts showing details of the copy VOL information consistency guaranty process shown in FIGS. 4 and 5, with FIG. 8 depicting the stage X (copy VOL change process), FIG. 9 depicting the stage Y (copy VOL change reflection process) and FIG. 10 depicting the stage Z (copy VOL working resumption process).

In FIG. 8, before executing the VOL replica, the active computer 100 informs the standby computer of the start of copy VOL change (step 0801, arrow 0881) and the standby computer 200 receives this notice (step 0821). After the step 0821, the standby computer 200 sets a status flag B1 indicating that the VOL replica process is in execution (step 0822) and executes the copy VOL status reflection process (9B in FIG. 9). Here, the flag setting process 0822 includes a step in which the switching unit 225 stores the flag in the VOL replica file 240 (arrow 0884). In the following description, a flag storing process (a storage process) similar to that 0884 will be carried out in the flag setting process even when not mentioned specifically.

On the other hand, after the step 0801, the cluster program 120 on the active computer 100 sets a status flag A1 indicative of the VOL replica execution start (step 0802) and then executes VOL replica (step 0803). When the VOL replica step 0803 ends, the cluster program 120 sets a status flag A2 indicative of the execution completion (step 0804, arrow 0883) and executes the copy VOL status reflection process (9A in FIG. 9).

Here, the steps 0801 and 0802 correspond to the step 0404 or 0504, the steps 0803 and 0804 correspond to the step 0405 or 0505, the steps 0821 and 0822 correspond to the step 0424 or 0524 and the communication 0881 corresponds to the communication 0481 or 0581.

In FIG. 9, the cluster program 120 of active computer 100 first decides whether pair division is carried out in the VOL replica process (step 0901). The VOL replica process will be executed in the step 0803 or step 1104 to be described later. The step 0901 is carried out for the following reason. During pair division, the standby computer accesses a copy VOL and hence the copy VOL needs to be released whereas during pair reconstruction, the copy VOL need not be released to permit the active computer to start working of the copy VOL. Accordingly, in the pair division mode, the cluster program 120 releases the copy VOL (step 0902). Thereafter, the cluster program 120 informs the standby computer of completion of the copy VOL change (step 0903, arrow 0981) and after setting a status flag A3 indicating that the standby computer 200 is executing the copy VOL status reflection process (step 0904), the active computer executes the copy VOL working resumption process (10A in FIG. 10). It is to be noted that together with the notice of copy VOL change completion (step 0902) (or at a different timing), information indicating whether the replica targeting the copy VOL is pair division or pair reconstruction may be transmitted to the standby computer 200. Here, the notice of copy VOL change completion or the aforementioned transmission of the information indicative of either the pair division or the pair reconstruction to the standby computer 200 can be made, when the active computer 100 detects the execution of the replica targeting the copy VOL or when the copy VOL lock release 0902 is completed.

On the other hand, when receiving the communication 0981 (step 0921), the cluster program 220 on the standby computer 200 sets a status flag B2 indicative of the execution start of the copy VOL change reflection process (step 0922). Thereafter, as in the step 0901, it is decided whether the pair division is carried out (step 0923). The reason for this is as below. During the pair division, the standby computer accesses the copy VOL and therefore lock control must be done whereas during the pair construction, the copy VOL information is merely erased and access to the copy VOL is unnecessary. It is to be noted that a decision as to whether the pair division is carried out can be made by directly consulting the information 2 transmitted from the active computer or by acquiring the information 2 corresponding to a physical (device) name of the copy VOL subjected to the copy volume reflection process by making reference to the replica status management table storing the VOL replica status flag. On the other hand, in 1109 of FIGS. 11 and 1205 of FIG. 12, a decision is made by the latter method, that is, by making reference to the information 2 stored in the replica status management table in correspondence with the physical (device) name of the copy VOL subjected to the copy volume reflection process.

When the pair division is determined, the cluster program 220 acquires a PVID of the copy VOL (step 0925) and thereafter, obtains the copy VOL lock (step 0926). Then, it acquires the copy VOL information (step 0927) and releases the copy VOL lock (step 0928). On the other hand, when the pair reconstruction is determined, the cluster program 120 erases the copy VOL information including the PVID of the copy VOL (step 0924). Through this, reflection of the copy VOL information upon the standby computer 200 is completed in the respective modes. Thereafter, a status flag B3 indicative of the reflection completion is set (step 0929) and the copy VOL working resumption process (10B in FIG. 10) is executed.

Here, the step 0902 corresponds to the step 0406, the steps 0903 and 0904 correspond to the step 0407 or 0506, the steps 0921 and 0922 correspond to the step 0425 or 0525, the step 0924 corresponds to the step 0526 and the communication 0981 corresponds to the communication 0484 or 0583. Further, the steps 0925 to 0928 correspond to the steps 0426 to 0429 in sequence.

In FIG. 10, the cluster program 220 on standby computer 200 informs the cluster program 120 on active computer 100 that the copy VOL information reflection is ended (step 1021, arrow 1081). After the step 1021, the cluster program 220 sets a status flag "0" indicating that the information has been reflected (step 1022) and the process again returns to the fault monitor process (7B in FIG. 7) to continue. On the other hand, when the cluster program 120 receives the communication 1081 (step 1001), it sets a status flag "0" indicating that the information has been reflected (step 1082). Thereafter, the cluster program 120 decides whether the pair division is done similarly to the step 0901 (step 1003). The reason for this is as below. During the pair division, the copy VOL is released in the stage Y and the copy VOL must be reacquired whereas in the pair division mode, the active computer has started working of the copy VOL in the stage Y. Accordingly, only in the pair division mode, the cluster program 120 executes acquisition of the copy VOL lock (step 1004) and thereafter informs the application 110 that working of the copy VOL is permissible (step 1005, arrow 1083). Subsequently, the process again returns to the fault monitor process (7A in FIG. 7) to continue.

Here, the steps 1001 and 1002 correspond to the step 0408 or 0507, the step 1004 corresponds to the step 0409, the steps 1021 and 1022 correspond to the step 0430 or 0527, and the communication 1081 corresponds to the communication 0489 or 0583. Further, the step 1005 is included in the step 0410.

Illustrated in FIG. 11 is a flowchart showing the procedures for the active computer to take over the VOL replica process and copy VOL in the event that a fault takes place. For steps in the process of FIG. 11 similar to those described in connection with FIGS. 8, 9 and 10, only the correspondence is indicated for simplicity of explanation. Firstly, the cluster program 120 of active computer 100 first consults the VOL replica status flag 222 to decide whether the status flag is "0" (step 1101). If the flag is "0" in the step 1101, it is indicated that the copy VOL information is reflected correctly. Therefore, in this case, the cluster program 120 does not proceed with the present process but simply executes the copy VOL information reflection process (12A, FIG. 12) upon the standby computer to be done in the event of the occurrence of a fault. If, in the step 1101, the flag is not "0", it is then decided whether the VOL replica has been completed during the fault occurrence (step 1102). In case the VOL replica has not been completed, the following instances will prevail, including an instance in which the active computer serving as the former active computer has the status flag A1, an instance in which the active computer serving as the former standby computer has the status flag B1 and the standby computer serving as the former active computer has the status flag A1. Here, the status flag of the standby computer indicates the status flag of standby computer acquired in the step 0704 in FIG. 7 which includes process to call the process 11A.

When, in the step 1102, the status flag of active computer is not A1, or the status flag of active computer is B1 and the status flag of the other party is not A2 or A3, it is indicated that the VOL replica is in execution and the active computer has not yet completed the change and therefore, the cluster program 120 executes the VOL replica corresponding to the stage X (FIG. 4) to reflect the copy VOL information upon the active computer (steps 1103 to 1105). Here, the steps 1103 to 1105 correspond to the steps 0802 to 0804, respectively. After a series of the reflection steps, the copy VOL information reflection process (12A in FIG. 12) upon the standby computer is executed.

On the other hand, when in the step 1102 "N" is determined, it is indicated that the VOL replica has already been executed. Then, the process is carried out in accordance with how far the standby computer reflection process after the execution is proceeded with.

Firstly, the cluster program 120 decides whether the status flag is A2 or A3 (step 1106). In case A2 or A3 is determined in the step 1106, it is indicated that the copy VOL information in the active computer has been reflected and the copy VOL information reflection completion notice from the standby computer is waited for and therefore, the cluster program 120 releases the notice wait state (step 1107). Next, when neither A nor A3 is determined in the step 1106, it is decided whether the status flag is B2 (step 1108). If in the step 1108 the status flag is B2, implying that the standby computer in the information reflection process is switched to the active computer, the cluster program 120 continues the information reflection process to reflect the copy VOL information. In the reflection process, like the stage Y (7B in FIG. 7), different steps are carried out in accordance with either the pair division mode or the pair reconstruction mode (steps 1109 to 1114). Here, the steps 1109 to 1114 correspond to the steps 0923 to 0928, respectively. On the other hand, if in the step 1108 the flag is not B2, it is indicated that the status flag is B3 and the standby computer having completed the reflection of the copy VOL status is switched to the active computer and therefore the copy VOL information reflection has been completed and no step needs to be undertaken.

Through the above, even when the status flag is neither A1 nor B1 in the step 1102, take-over of the copy VOL information has been completed and therefore, the status flag is set to "0" (step 1115) and like the stage Z of active computer (FIG. 10), the copy VOL working start process is carried out in accordance with either the pair division or the pair reconstruction mode (steps 1116 to 1118, arrow 1181). Here, the steps 1116 to 1118 correspond to the steps 1003 to 1005, respectively and the communication 1181 corresponds to the communication 1083. Thereafter, the copy VOL information reflection process upon the standby computer (12A in FIG. 12) is carried out.

Illustrated in FIG. 12 is a flowchart showing the procedures for the volume information taken over to the active computer in the event that the active/standby computers become faulty is taken over to the standby computer. Like FIG. 11, for steps in FIG. 12 similar to those described in connection with FIGS. 8, 9 and 10, only the correspondence will be described for simplicity of explanation.

Firstly, each of the cluster programs 120 and 220 of the active and standby computers 100 and 200 mutually transmits the status flag of the self-party to the other party to recognize the party status mutually (steps 1201 1221, arrow 1281). The reasons for this are as below: that is, for deciding whether the copy VOL status reflection process of the standby computer has already been reflected in accordance with the status flag of the standby computer (the standby computer status flag being "0" or A2, or A3 or B3), for deciding an instance in which when the copy VOL status reflection is necessary in the standby computer, the standby computer needs to execute the stage X (the active computer status flag being A1 or B1) in accordance with the status flag of the active computer, and because the process is different for the case where the standby computer executes the copy VOL take-over process (stage Y) and for the case where the standby computer reflecting the copy VOL status is switched and the active computer needs to take over the copy VOL status (the active computer status flag being B2).

Accordingly, the cluster programs 120 and 220 decide whether the standby computer status flag is 0 or A2, or A3 or B3 (steps 1202 and 1222). When in the steps 1202 and 1222, "Y" is issued, the active and standby computers return to the fault monitor process to continue the process (7A and 7B in FIG. 7). On the other hand, when in the steps 1202 and 1222, "N" is issued, it is indicated that the standby computer needs to reflect the copy VOL status and therefore, the cluster programs 120 and 220 decide whether the active computer status flag is A1 or B1 (steps 1203 and 1223). If, in the steps 1203 and 1222, A1 or B1 is settled, the active and standby computers carry out the execution starting from the stage X (8A/8B in FIG. 8).

When the results in the steps 1203 and 1223 are other than the above, the standby computer 200 must execute the VOL reflection process and therefore it executes the stage Y (9B in FIG. 9). On the other hand, the active computer 100 decides by means of the cluster program 120 whether the active computer status flag is B2 (step 1204). When in the step 1204 the flag is B2, implying that the copy VOL status needs to be taken over, a step similar to the stage Y of standby computer (9B in FIG. 9) is carried out to reflect the copy VOL information upon the active computer (steps 1205 to 1208). Here, the steps 1205 to 1207 correspond to the steps 0923 to 0925 and the step 1208 corresponds to the step 0927. When the steps 1205 to 1208 are completed, causing the active computer to have completed the information reflection, the status flag A2 is set through a step similar to the step 0804 (step 1209). Then, the stage Y is executed (9A in FIG. 9). On the other hand, the flag is determined not to be B2 in the step 1204, the stage Y is executed as it is (9A in FIG. 9).

Advantageously, through the processes shown in FIGS. 11 and 12, even when a fault occurs in the course of the execution of the consistency guaranty process of copy VOL information shown in FIGS. 6 to 10, the active computer continuously takes over the process in execution to guarantee the consistency of the copy VOL information. In addition, the above advantage can be combined with an advantage that the party switchover can be guaranteed when a fault occurs after the consistency guaranty process shown in FIGS. 4 and 5 to bring about an advantage that a highly utilizable system can be constructed which can take over the process including the VOL replica from the active computer to the standby computer even in the event that a fault occurs in the active computer/standby computer system executing the VOL replica. The following description will be given by way of example of operation in which after the communication process 0484 in the stage Y of FIG. 4 (step 0407), a fault occurs in the active computer and the party switchover is effected. In this case, the copy VOL change process is in the pair division mode and is completed and therefore, the party switchover is done while the status flag A3 being set in the active computer and the status flag B2 being set in the standby computer to execute the flowchart shown in FIG. 7. After the party switchover, the active computer serving as the former standby computer has the status flag B2 whereas the standby computer serving as the former active computer has the status flag A3.

Firstly, in FIG. 7, the copy VOL information reflection process is determined to be necessary in the steps 0705 and 0725. Through this, the active computer executes the process indicated at 11A in FIG. 11 and the standby computer executes the process indicated at 12B in FIG. 12.

Subsequently, the active computer holding the status flag B2 in FIG. 11 proceeds to the step 1108 through the steps 1101, 1102 and 1106. In the step 1108, "Y" is issued. This implies that the copy VOL change process has already been completed in the former active computer and because of the pair division mode, the active computer serving as the former standby computer performs the copy VOL information reflection process (steps 1111 to 1113). Because of the completion of the copy VOL information reflection process, a copy VOL is created through pair division after the status flag is cleared and therefore, this copy VOL is used to start copy VOL working (steps 1116 to 1118). Thereafter, the process shifts to 12A in FIG. 12.

In FIG. 12, as described previously, the active computer having the status flag "0" first executes the step 1201 and the standby computer having the status flag A3 executes the step 1221. As a result, because of the standby computer status flag being A3, the copy VOL information reflection is determined as being completed and both the active and standby computers shift to the process indicated at 7A and 7B in FIG. 7 representing the normal working state.

Thus, when a fault occurs in the active computer after the communication process 0484 in the stage Y of FIG. 4 is done, the copy VOL information reflection process is continuously proceeded with even after the party switchover, thereby ensuring that the consistency of the copy VOL information can be kept and the active computer can start working by using the copy VOL.

In the foregoing description, another embodiment has been described in which only the copy VOL completion notice is effected before the party switchover and the copy VOL information reflection process is carried out after the party switchover takes place.

Thereafter, even when a fault occurs in the active computer, the standby computer is permitted to access the copy VOL so as to normally take over both the original and copy VOL service affairs, thereby solving the conventional problems.

Although in the present embodiment the fault has been described as being caused in the active and standby computers, the technique of the present embodiment can be applied to an instance in which a fault occurs in the network utilized by the communication means 01, by taking the priority of the active and standby computers into consideration.

As described above, the changed copy volume information is reflected upon the standby computer by taking the opportunity of the execution of the volume replica causing the copy volume to change and therefore, even when a fault occurs in the active computer after the execution of the volume replica, the process can be handed over to the standby computer. Further, even when a fault occurs during the execution of the volume replica and copy volume reflection process, the process being in execution at the time that the fault occurs can be taken over after the party switchover.

As has been set forth so far, according to the present invention, the change of the copy VOL due to the VOL replica means can be reflected upon the standby computer.

What is claimed is:

1. A storage medium storing a program for when executed, making an active computer which holds a first disk management information buffer adapted to store physical device names of volumes stored in a disk device and volume Identifiers with correspondence between the physical device names and the volume identifiers, function as:

a monitor for detecting that execution of a replica corresponding to a volume is completed in said disk device; and a first switching unit of a standby computer, responsive to the result of the detection in said monitor, for determining to transmit, to said standby computer, a notice for informing said standby computer that a volume identifier stored in said volume subjected to the execution of the replica is changed, wherein said program in said storage medium, when executed, making said standby computer which holds a second disk management information buffer adapted to store in corresponding relation physical device names of volumes and volume identifiers and a replica status management table adapted to manage a status concerning the presence or absence of a volume identifier, function as a second switching unit of said standby computer for executing:

a first process in which when said notice to the effect that said volume identifier stored in said volume is changed is received from said active computer, a first flag is stored in said replica status management table in correspondence with said physical device name of said volume, a second process including a step of deciding as to whether said first flag is stored in said replica status management table in correspondence with said physical device name according to which said volume identifier stored in said volume is acquired and said acquired volume identifier is stored in said second management information buffer in correspondence with said physical device name of said volume, and a third process in which when said second process is completed, said first flag stored in said replica status management table in correspondence with said physical device name is erased.

2. A party switchover method in a computer system having an active computer, a standby computer for taking over processes of said active computer and a disk device for storing volumes shared by said active computer and said standby computer, comprising:

a first step of causing said active computer to decide whether a volume identifier stored in a volume is changed;

a second step of causing said active computer to determine, in accordance with the result of said decision in said first step, transmission to said standby computer of a notice to the effect that said volume identifier is changed;

a third step of causing said active computer to transmit to said standby computer, in accordance with the result of said decision in said first step, a physical device name of a copy volume whose volume identifier is changed, wherein said standby computer has a buffer holding a table for storing in corresponding relation physical device names of volumes and volume identifiers;

a fourth step of causing in said active computer to decide, in accordance with the result of said decision in said first step, whether information is transmitted to said standby computer, said information being adapted to designate a method of changing said volume identifier stored in said buffer in correspondence with said physical device name transmitted to said second computer, wherein each of said active and standby computers holds a table for storing in corresponding relation physical device names of volumes and flags indicative of statuses concerning the presence or absence of changes of volume identifiers of said volumes;

a fifth step of causing said active computer to store, when a volume identifier stored in a volume is determined to be changed, a first flag in said table held in said active computer in correspondence with a physical device name of said volume; and a sixth step of causing said standby computer to store, when a volume identifier of a volume stored in said buffer is changed, a second flag in said table held in said standby computer in correspondence with a physical device name of said volume.

3. A party switchover method in a computer system having an active computer, a standby computer for taking over processes of said active computer and a disk device for storing volumes shared by said active computer and said standby computer, comprising:

a first step of causing said active computer to decide whether a volume identifier stored in a volume is changed;

a second step of causing said active computer to determine, in accordance with the result of said decision in said first step, transmission to said standby computer of a notice to the effect that said volume identifier is changed;

a third step of causing said active computer to transmit to said standby computer, in accordance with the result of said decision in said first step, a physical device name of a copy volume whose volume identifier is changed, wherein said standby computer has a buffer holding a table for storing in corresponding relation physical device names of volumes and volume identifiers;

a fourth step of causing in said active computer to decide, in accordance with the result of said decision in said first step, whether information is transmitted to said standby computer, said information being adapted to designate a method of changing said volume identifier stored in said buffer in correspondence with said physical device name transmitted to said second computer, wherein each of said active and standby computers holds a table for storing in corresponding relation physical device names of volumes and flags indicative of statuses concerning the presence or absence of changes of volume identifiers of said volumes;

a fifth step of causing said standby computer to decide whether a first flag, stored in said table of said active computer, is stored and whether a second flag, stored in said table of said standby computer, is not stored in said table of said standby computer in correspondence with a physical device name; and a sixth step of causing said standby computer to decide, in accordance with the result of said decision, whether a volume identifier stored in said buffer in correspondence with said physical device name is to be changed.

4. A computer system comprising:
an active computer;
a standby computer for taking over processes of said active computer; and
a disk drive for storing volumes shared by said active computer and said standby computer,
wherein each of said active and standby computers holds a table for storing in corresponding relation physical device names of volumes and flags indicative of statuses concerning the presence or absence of changes of volume identifiers of said volumes,
wherein a first switching unit of said active computer is adapted to store, in accordance with the result of detection that a volume identifier stored in a volume is changed by means of said monitor, a first flag in said table of said active computer in correspondence with a physical device name of said volume, and
wherein said standby computer has a second switching unit which, when a volume identifier of a volume stored in said buffer is changed, stores a second flag in said table of said standby computer in correspondence with a physical device name of said volume.

5. A standby computer connected to an active computer, comprising:
a table for storing in corresponding relation physical device names of volumes and flags indicative of statuses concerning the presence or absence of changes of volume identifiers of said volumes as detected by a monitor of and transmitted from a first switching unit of said active computer; and
a second switching unit for deciding whether a first flag, stored in said table of said active computer, is stored and whether a second flag, stored in said table of said standby computer, is not stored in said table of said standby computer in correspondence with a physical device name, and determining, in accordance with statuses of said flags, whether a volume identifier stored in said buffer in correspondence with said physical device name is to be changed.

6. A computer system comprising:
an active computer which holds a first disk management information buffer adapted to store physical device names of volumes stored in a disk device and volume identifiers with correspondence between the physical device names and the volume identifiers; and
a standby computer which holds a second disk management information buffer adapted to store in corresponding relation physical device names of volumes and volume identifiers and a replica status management table adapted to manage a status concerning the presence or absence of a volume identifier,
wherein said active computer comprises:
a monitor for detecting that execution of a replica corresponding to a volume is completed in said disk device, and
a first switching unit of said standby computer, responsive to the result of the detection in said monitor, for determining to transmit, to said standby computer, a notice for informing said standby computer that a volume identifier stored in said volume subjected to the execution of the replica is changed,
wherein said standby computer comprises:
a second switching unit of said standby computer for executing:
a first process in which when said notice to the effect that said volume identifier stored in said volume is changed is received from said active computer, a first flag is stored in said replica status management table in correspondence with said physical device name of said volume,
a second process including a step of deciding as to whether said first flag is stored in said replica status management table in correspondence with said physical device name according to which said volume identifier stored in said volume is acquired and said acquired volume identifier is stored in said second management information buffer in correspondence with said physical device name of said volume, and
a third process in which when said second process is completed, said first flag stored in said replica status management table in correspondence with said physical device name is erased.

* * * * *